United States Patent
Manteghi et al.

(10) Patent No.: US 10,135,650 B2
(45) Date of Patent: Nov. 20, 2018

(54) TIME VARIANT ANTENNA FOR TRANSMITTING WIDEBAND SIGNALS

(71) Applicant: Virginia Tech Intellectual Properties, Inc., Blacksburg, VA (US)

(72) Inventors: Majid Manteghi, Blacksburg, VA (US); Mohsen Salehi, Woodbury, MN (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 46 days.

(21) Appl. No.: 15/038,394

(22) PCT Filed: Nov. 20, 2014

(86) PCT No.: PCT/US2014/066672
§ 371 (c)(1),
(2) Date: May 20, 2016

(87) PCT Pub. No.: WO2015/077483
PCT Pub. Date: May 28, 2015

(65) Prior Publication Data
US 2016/0294056 A1    Oct. 6, 2016

Related U.S. Application Data

(60) Provisional application No. 61/906,652, filed on Nov. 20, 2013.

(51) Int. Cl.
*H04B 1/18* (2006.01)
*H04L 27/12* (2006.01)
(Continued)

(52) U.S. Cl.
CPC ............... *H04L 27/12* (2013.01); *H01Q 3/34* (2013.01); *H01Q 3/44* (2013.01); *H01Q 5/00* (2013.01);
(Continued)

(58) Field of Classification Search
CPC .. H04B 27/02; H04B 1/006; H03J 3/20; H03J 3/22
(Continued)

(56) References Cited

U.S. PATENT DOCUMENTS 8,862,054 B2 * 10/2014 Ishizaki ............... H02J 17/00
455/41.1
9,577,714 B2 * 2/2017 Rehm ..................... H02J 5/005
(Continued)

*Primary Examiner* — Sonny Trinh
(74) *Attorney, Agent, or Firm* — Blank Rome LLP

(57) ABSTRACT

A circuit for tuning a resonance frequency of an electrically small antenna. The circuit includes a first source configured for providing a modulation signal, a second source configured for providing a periodic electrical signal, an antenna, and a tuning circuit configured for modulating a resonance frequency of the antenna in response to the modulation signal. The tuning circuit includes first and second capacitors that are alternately coupled to the antenna to change the resonance frequency of the antenna. The capacitor currently coupled to the antenna is decoupled from the antenna and the other capacitor is coupled to the antenna when the voltage across the capacitor currently coupled to the antenna is momentarily zero. In an exemplary embodiment, the tuning circuit comprises first and second inductors rather than capacitors. The inductors are switched into and out of the circuit when the current through the currently coupled inductor is momentarily zero.

9 Claims, 25 Drawing Sheets

(51) Int. Cl.
  *H04B 1/04* (2006.01)
  *H01Q 3/44* (2006.01)
  *H01Q 5/00* (2015.01)
  *H01Q 9/04* (2006.01)
  *H01Q 5/25* (2015.01)
  *H01Q 3/34* (2006.01)
  *H04B 1/00* (2006.01)

(52) U.S. Cl.
  CPC ............ *H01Q 5/25* (2015.01); *H01Q 9/0421* (2013.01); *H04B 1/006* (2013.01); *H04B 1/04* (2013.01)

(58) Field of Classification Search
  USPC ............ 455/164.1, 119, 173.1, 182.1, 182.2, 455/192.2, 257
  See application file for complete search history.

(56) References Cited

U.S. PATENT DOCUMENTS

| | | |
|---|---|---|
| 2003/0117270 A1 | 6/2003 | Dimmer et al. |
| 2004/0113790 A1 | 6/2004 | Hamel et al. |
| 2005/0017602 A1 | 1/2005 | Arms et al. |
| 2006/0197711 A1 | 9/2006 | Sekiguchi et al. |
| 2007/0216590 A1 | 9/2007 | Montgomery et al. |
| 2007/0236219 A1 | 10/2007 | Deimling et al. |
| 2010/0079288 A1 | 4/2010 | Collins et al. |
| 2012/0183097 A1 | 7/2012 | Ishizaki |

\* cited by examiner

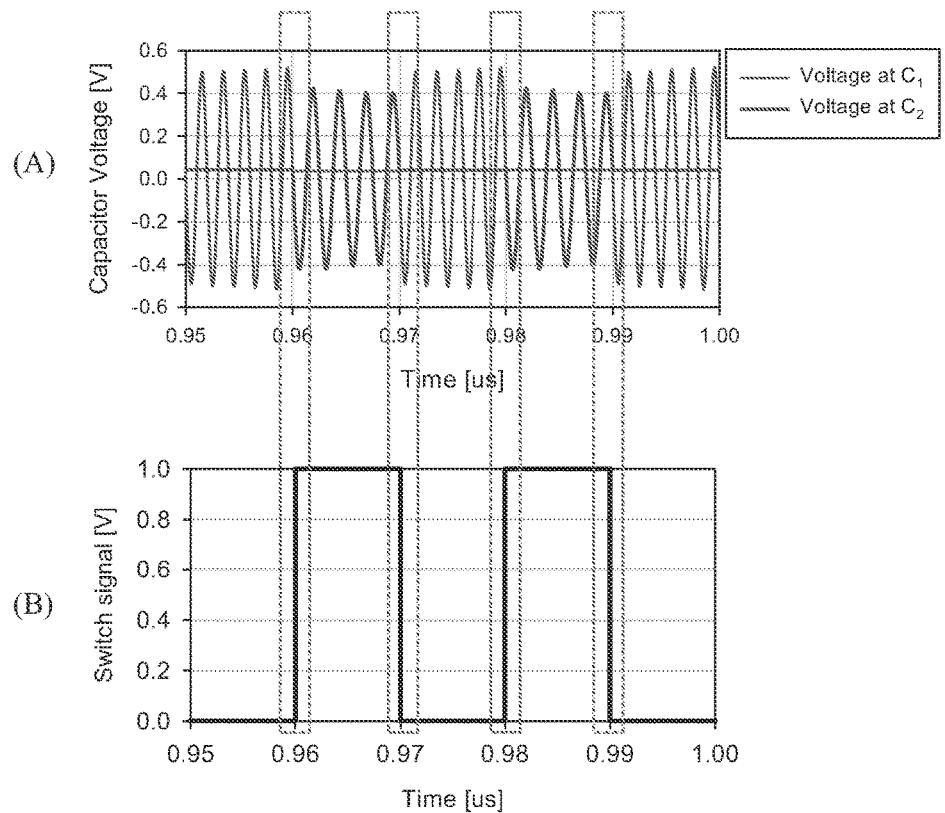
FIG. 13
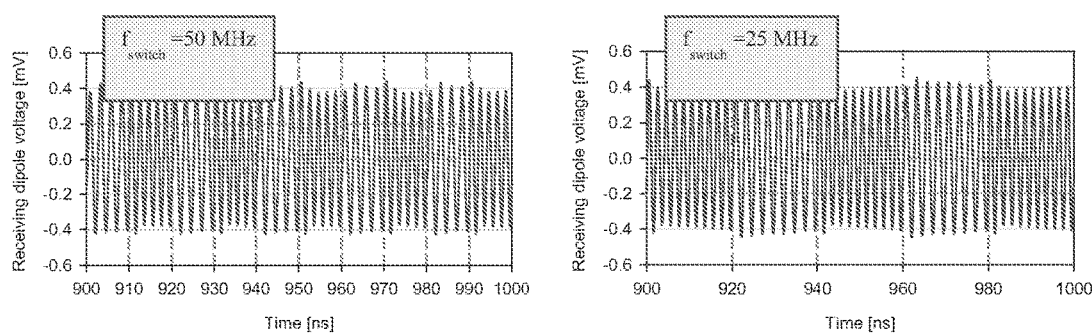
FIG. 14A            FIG. 14B

TIME VARIANT ANTENNA FOR TRANSMITTING WIDEBAND SIGNALS

RELATED APPLICATION

This application us a national phase of PCT/US2014/066672, filed on Nov. 20, 2014, which claims the benefit of U.S. Provisional Application No. 61/906,652, entitled "A Wideband Frequency-Shift Keying Modulation Technique Using Transient State of a Small Antenna" and filed Nov. 20, 2013, the contents of which applications are incorporated herein by reference.

FIELD OF THE INVENTION

The present invention relates to a time variant antenna for transmitting wideband signals and more specifically to a circuit including a high-Q, time variant antenna for transmitting wideband signals and a tuning circuit for changing the resonant frequency of the antenna.

BACKGROUND OF THE INVENTION

Wireless communication techniques have been widely developed during the past decades due to their extensive applications. One desirable characteristic of most wireless systems is a wide bandwidth. Although there have been studies on different techniques to broaden the bandwidth of small antennas, the antenna bandwidth strictly follows the fundamental physical limit. It is well-understood that, in linear time-invariant (LTI) structures, antenna bandwidth is in contradiction with the size, and hence, small-size antennas suffer from narrow bandwidth [1-3]. This problem becomes significant when a high-rate data-transmission is required along with a very small-size antenna.

Designing ultra-wideband (UWB) antennas which are capable of transmitting high data-rate information while occupying a small volume has received attention. For instance, biomedical implants desirably have a small size while transmitting high data-rate information. Particularly, devices that interact with the nervous systems such as cochlear and visual prostheses need to transmit a large amount of data in order to provide high-resolution sensing for the user [4-6]. Even though a high data-rate can be achieved in broadband systems by increasing the carrier frequency, in low-frequency applications such as biomedical implantable devices, high-bandwidth data-transmission remains an open challenge.

Modeling the antennas by lumped-element equivalent circuit has been extensively studied. Wheeler [7] introduced the concept of LC circuit equivalence in a parallel or series arrangement for TM01 and TE01 modes, respectively. Schaubert [8] applied Prony's method to Time-Domain Reflectometer (TDR) data to synthesize a rational function with real coefficients that describes the input impedance of the antenna as the summation of poles. Schelkunoff [9] introduced a general representation of impedance functions based on an arbitrary number of resonant frequencies and developed a wideband equivalent circuit. Kim and Ling [10] used a rational-function approximation in conjunction with Cauchy method [11] to find the coefficients by using the frequency-domain data. Also, the Singularity Expansion Method (SEM) [12] and Method of Moments (MoM) [13] have been used to derive equivalent circuit for antennas. Many different approaches to find broadband equivalent circuit for antennas have been proposed as well [14-19].

SUMMARY OF THE INVENTION

In accordance with an aspect of the present invention, there is provided a circuit for tuning a resonance frequency of an electrically small antenna. The circuit includes a first source configured for providing a modulation signal, a second source configured for providing a periodic electrical signal, an antenna, and a tuning circuit configured for modulating a resonance frequency of the antenna between a first resonant frequency and a second resonant frequency and only between the first resonant frequency and the second resonant frequency in response to the modulation signal.

In accordance with another aspect of the present invention, there is provided a method for tuning a resonance frequency of an electrically small antenna. The method includes steps of generating a modulation signal, generating a periodic electrical signal, powering an antenna with the periodic electrical signal, and modulating a resonance frequency of the antenna between a first resonant frequency and a second resonant frequency and only between the first resonant frequency and the second resonant frequency in response to the modulation signal.

BRIEF DESCRIPTION OF THE DRAWINGS

For the purpose of illustration, there are shown in the drawings certain embodiments of the present invention. In the drawings, like numerals indicate like elements throughout. It should be understood that the invention is not limited to the precise arrangements, dimensions, and instruments shown. In the drawings:

FIGS. 13A, 13B, 14A, and 14B illustrate various plots resulting from a simulation of the circuit of FIG. 5, in accordance with an exemplary embodiment of the present invention;

DETAILED DESCRIPTION OF THE INVENTION

Figure 1A:
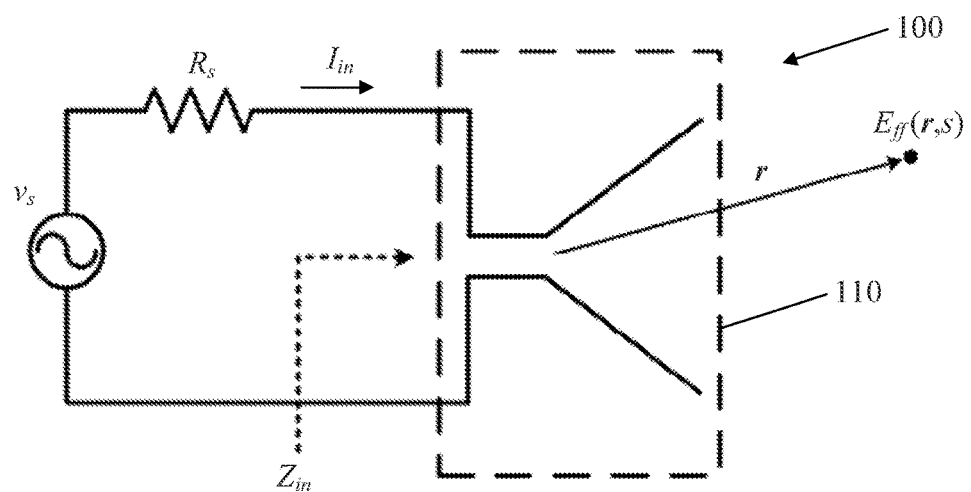
FIG. 1A illustrates a circuit diagram of a circuit comprising an antenna that operates in a single resonant mode, in accordance with an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

High-Q small antennas excite only one spherical mode, known as the fundamental mode. A self-resonant small antenna can be represented by an RLC circuit. Although an equivalent circuit is found by mimicking the input impedance of the antenna by that of an RLC circuit, transient properties of the radiated fields such as damping factor (or time constant) are also similar to those of the circuit model. Since the radiation resistance of the antenna is lumped into a resistor, one can compare the radiated fields of an antenna excited at the $n^{th}$ resonant mode with the load voltage of an equivalent RLC circuit that is tuned to the resonant frequency of the antenna and resembles the antenna input impedance.

Figure 1B:
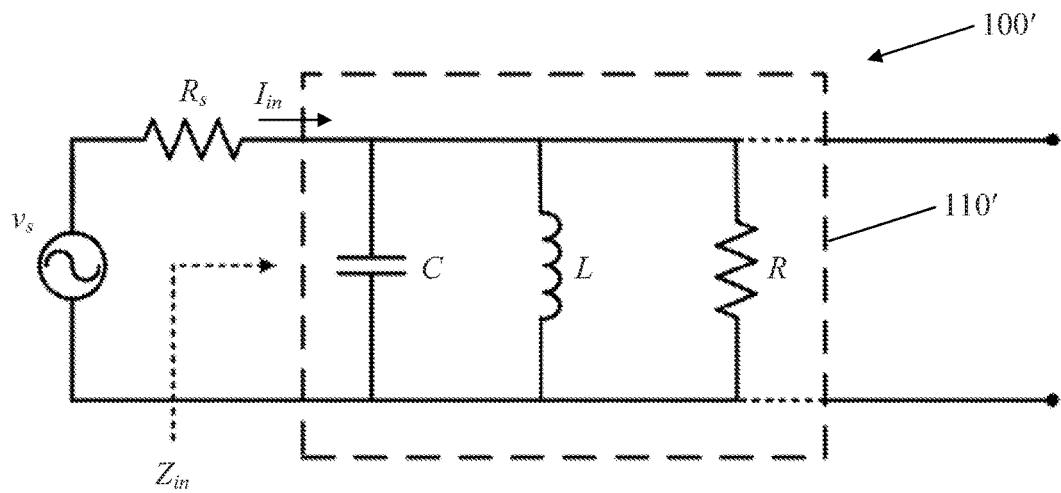
FIG. 1B illustrates a equivalent circuit to the circuit illustrated in FIG. 1A, in accordance with an exemplary embodiment of the present invention.

Referring now to the figures, there are illustrated in FIG. 1A a circuit diagram of a circuit 100 comprising an antenna 110 that operates in a single resonant mode ($n^{th}$ mode) and in FIG. 1B an equivalent circuit 100' comprising an RLC circuit 110' that is equivalent to the antenna 110. The input impedance, $Z_{in}$, of the antenna 110 is the same as the input impedance, $Z_{in}$, of the equivalent circuit 110'. The antenna is an electrically small antenna, e.g., as an antenna whose ka factor is smaller than one, where k is wave number and a is the radius of the smallest enclosing sphere. The RLC circuit 110' comprises a capacitor, C, an inductor L, and a resistor, R, connected in parallel with one another.

With reference to FIG. 1A, the current distribution on the surface of the antenna 110 in a tuned mode can be expressed as:

$$J_n(r', s) = \frac{J_n(r')}{(s - s_n)(s - s_n^*)}. \qquad 1$$

where $s_n$ and $s^*_n$ are the unloaded conjugate poles associated with the $n^{th}$ resonance of the antenna 110, and $J_n(r')$ is the spatial current distribution on the surface of the antenna 110.

Assuming that the current distribution is known, the electric far field of the antenna 110 can be expressed as:

$$E_n(r, s) = \frac{\mu}{4\pi r} \int_{S'} s \cdot J_n(r', s) e^{-\frac{r - \hat{r} \cdot r'}{c} s} dS' = \qquad 2$$

$$\frac{\mu}{4\pi r} \frac{s}{(s - s_n)(s - s_n^*)} \int_{S'} J_n(r') e^{-\frac{r - \hat{r} \cdot r'}{c} s} dS'.$$

Equation (2) denotes that the electric field in the far-field zone has the same poles as the surface current of the antenna 110. These poles can be found by using the equivalent RLC circuit 110' as depicted in FIG. 1B. The input current, $I_{in}$, and the input impedance, $Z_{in}$, of the RLC circuit 110' can be expressed as:

$$I_{in} = \frac{V_s}{R_s + Z_{in}}. \qquad 3$$

$$Z_{in} = \frac{\frac{1}{C}s}{(s - s_n)(s - s_n^*)}. \qquad 4$$

where:

$$s_n = -\frac{\omega_{0n}}{2Q_n} + j\omega_{0n}\sqrt{1 - \frac{1}{4Q_n^2}}. \qquad 5$$

where $\omega_{0n}$ and $Q_n$ are, respectively the resonant frequency and the unloaded Q factor of the circuit 110' and are defined as:

$$\omega_{0n} = \frac{1}{\sqrt{L_n C_n}}; \qquad 6$$

$$Q_n = R_n C_n \omega_{0n}.$$

The load voltage can be now expressed as:

$$V_o = Z_{in} \cdot I_{in} = \frac{\frac{1}{R_s C} s \cdot V_s}{(s - s_{n_{loaded}})(s - s_{n_{loaded}}^*)}. \qquad 7$$

where loaded roles are:

$$s_{n_{loaded}} = -\frac{\omega_{0n}}{2Q_{n_{loaded}}} + j\omega_{0n}\sqrt{1 - \frac{1}{4Q_{n_{loaded}}^2}}. \qquad 8$$

$Q_{n_{loaded}}$ is the loaded quality factor and is equal to $Q_{n_{loaded}} = (R_n \| R_s) C_n \omega_{0n}$. Equation (8) gives the electric far-field poles of any arbitrary small antenna, e.g., the antenna 110, that operates in single mode at resonant frequency, $\omega_{0n}$, with a corresponding Q factor, $Q_{n_{loaded}}$.

The equivalent circuit model 110' can be constructed based on a simulated or measured input impedance. Since the poles of the modal currents are preserved in the far zone, the equivalent circuit 110' can be employed to evaluate the transient characteristics of the antenna 100 in the far field. Even though the circuit model 110' does not account for the time delay, free-space loss, or directional aspects of the radiation, such as polarization and directivity, these parameters do not contribute to the radiation poles and affect only the residue of each pole, i.e., the magnitude of the electric fields. Moreover, the electric near-field can be also represented by the same poles. Generally, if the current distribution is expanded by the natural poles of the antenna 100, any time-derivation or integration of Maxwell's equations will not impact the location of the poles. In other words, the damping factor of the fields for each resonant mode is identical at any measurement point.

Equation (8) suggests that the damping factor for the electric fields of the $n^{th}$ resonance is equal to:

$$\alpha_n = \frac{\omega_{0n}}{2Q_{n_{loaded}}}. \qquad 9$$

in small antennas with Q>>1, Q can be well approximated by the inverse of 3-dB impedance bandwidth as:

$$Q_{n_{loaded}} = \frac{1}{BW_{3dB}} = \frac{f_{0n}}{\Delta f_{n_{3dB}}}. \qquad 10$$

where $\Delta f_{n_{3dB}} = f_{H-3dB} - f_{L-3dB}$. Equation (9) implies that the damping factor is inversely proportional with the antenna loaded Q. Since at higher order resonances, electrical size of the antenna 110, i.e. ka, is larger, the Q factor will be smaller. Therefore, the lowest damping factor is associated with the fundamental mode. By combining Equations (9) and (10) one finds:

$$\alpha_n = \pi \cdot \Delta f_{n_{3dB}} \qquad 11.$$

Equation (11) shows that the damping factor of the $n^{th}$ resonant field can be found by having the absolute 3-dB bandwidth of the antenna 110. It should be emphasized that Equation (11) is based on the equivalent circuit model 110' and is valid only if the antenna 110 is narrowband such that Equation (10) holds, which is the case in a typical small-size antenna, e.g., the antenna 110.

Figure 2:
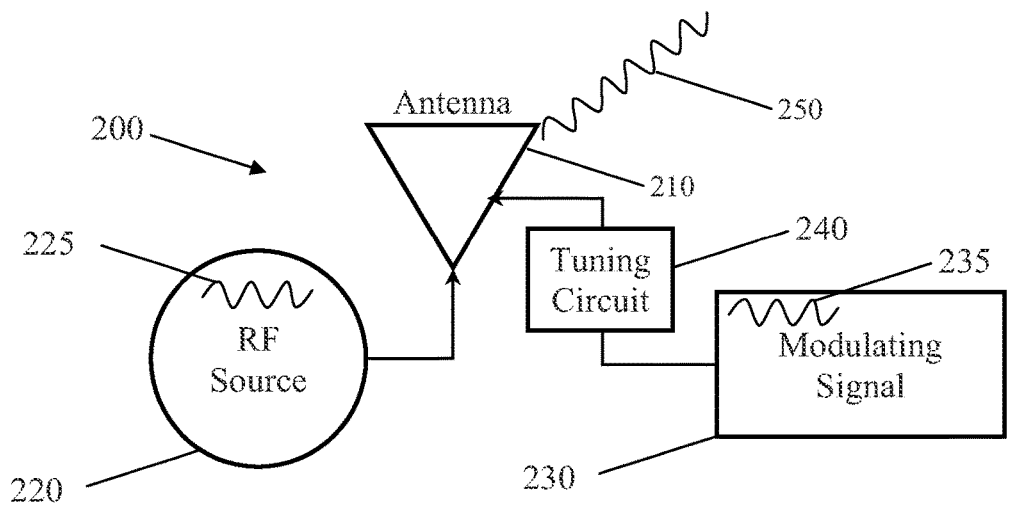
FIG. 2 illustrates a circuit comprising a tune variant, narrowband antenna, an RF source, a signal source, and a tuning circuit for tuning the narrowband antenna, in accordance with an exemplary embodiment of the present invention.

Referring to FIG. 2, there is illustrated an exemplary embodiment of a circuit, generally designated as 200, comprising a time-variant, narrowband antenna 210, an RF source 220, a signal source 230, and a tuning circuit 240, in accordance with an exemplary embodiment of the present invention. The antenna 210 is made time variant by way of an external signal (also referred to as a "modulating signal") 235 generated by the signal source 230. The modulating signal 235 controls the tuning circuit 240, which changes the electrical length, i.e., the resonance frequency, of the antenna 210.

Time variance is a technique based on the transient behavior of the antenna 210 which allows it to transmit wide bandwidth (high data rate) information via an RF signal 250 using RF energy 225 provided by the RF source 220, while having an electrically small size. The structure of the antenna 210 allows for it to respond to the required time variation. Parameters of the antenna 210 that may be subject to time variation include frequency shift in the impedance of the antenna 210, change in angular behavior in the radiation pattern of the RF signal 140 generated by the antenna 210, and change in the magnitude of the RF signal 140.

The antenna 210 is a tunable narrowband antenna used in frequency modulation applications. The idea for frequency modulation of the tunable antenna 210 is based on the fact that time variant boundary conditions will shift the stored energy around the antenna 210 from a first frequency, $f_1$, to a second frequency, $f_2$, different from the first frequency, $f_1$, based on the modulating signal 235. For example, if the resonant frequency of the antenna is at $f_1$ and the modulating signal 235 changes the resonance frequency of the antenna 210 to $f_2$, the stored energy around the antenna 210 will shift to the new frequency, $f_2$, almost immediately. Therefore, one can modulate the radiated field 250 by switching the resonant frequency of the antenna 210. The high quality factor of a narrowband antenna allows the antenna 210 to have a small size. Therefore, by changing the resonant frequency of the antenna 210, the system 200 provides that a very small antenna 210 is able to radiate a wideband signal 250.

In one exemplary embodiment of the circuit 200, the antenna 210 is an electric antenna, such that the stored energy in the near field is dominated by the electric field. The tuning circuitry 240 is capacitive. Examples of electric antennas that may be used as the antenna. 210 include a dipole antenna, a monopole antenna, a Planar Inverted-F Antenna, a microstrip patch antenna, and a miniaturized slot antenna, etc.

In another exemplary embodiment of the circuit 200, the antenna 210 is a magnetic antenna, such that the stored energy in the near field is dominated by the magnetic field. The tuning circuitry 240 is inductive. Examples of magnetic antennas that may be used as the antenna 210 include a loop antenna.

In an exemplary embodiment, the antenna 210 and the tuning circuitry 240 form an antenna module. In another exemplary embodiment, the antenna 210, the tuning circuitry 240, and the RF source 220 form the antenna module. In either of these embodiments, the antenna module may be implemented on a circuit board.

In another exemplary embodiment, the circuit 200 is implemented in a small electronic device, such as a mobile telephone, an implanted medical device, etc. It is contemplated that the circuit 200 may be used wherever an electrically small antenna for transmitting a wideband wireless signal is desirable.

In yet another exemplary embodiment, the circuit 200 further comprises a processor and one or more computer readable tangible media (memory) having software instructions stored thereon. The processor is coupled to the sources 230 and 240. The one or more computer readable tangible media are coupled to the processor. The processor is configured to access the one or more computer readable tangible media to load and execute the software instructions for performing a first step of sending a first control signal to the source 220 for generating the periodic electrical signal 225 for powering the antenna 210 with the periodic electrical signal 225, and a second step of sending a second control signal to the source 230 for generating the modulating signal 235 and providing it to the tuning circuit 240 for modulating the resonance frequency of the antenna 210 between the first frequency, $f_1$, and the second frequency, $f_2$, and only between the first frequency, $f_1$, and the second frequency, $f_2$, in response to the modulating signal 235.

In still another exemplary embodiment, the system 200 comprises a switched capacitor logic unit. The switched capacitor logic unit comprises the tuning circuit 240 and a switch configured for controllably coupling and decoupling the capacitors in the tuning, circuit. In another exemplary embodiment, the system 200 comprises a switched inductor logic unit. The switched inductor logic unit comprises the tuning circuit 240 and a switch configured for controllably coupling and decoupling the inductor in the tuning circuit. Controllable coupling and decoupling of capacitors or inductors and exemplary switches are described below.

Figure 3:
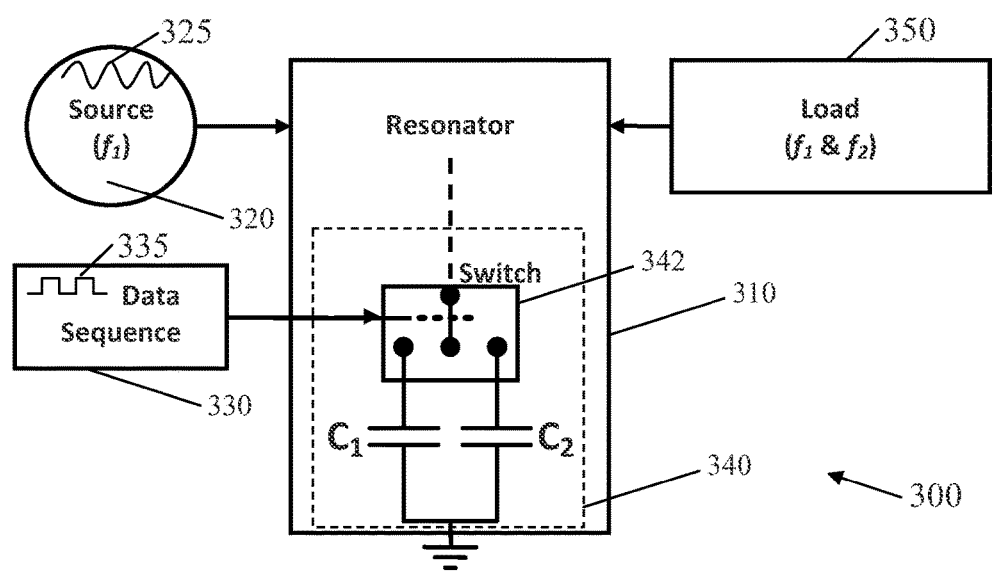
FIG. 3 illustrates an equivalent circuit model of the circuit of FIG. 2 in which the antenna of FIG. 2 is represented by an equivalent resonator in FIG. 3, the equivalent circuit model of FIG. 3 comprising a tuning circuit comprising a pair of capacitors that are alternately switched into the circuit, in accordance with an exemplary embodiment of the present invention.

Referring now to FIG. 3, there is illustrated a model, generally designated as 300, of the circuit 200 of FIG. 2, in accordance with an exemplary embodiment of the present invention. The circuit model (or simply "circuit") 300 comprises a resonator 310, a carrier generator 320, a data sequence generator (also referred to herein as "a tuning circuit controller") 330, a tuning circuit 340, and a load 350.

The tuning circuit 340 is configured for changing a resonance frequency of the resonator 310. The tuning circuit 340 comprises a switch 342, a first capacitor, $C_1$, and a second capacitor, $C_2$. In an exemplary embodiment, the switch 342 is a semiconductor switch.

The carrier generator 320 generates a carrier signal 325 having a frequency, $f_1$. The data sequence generator 330 (tuning circuit controller 330) generates a data sequence 335. In an exemplary embodiment, the data sequence 335 is a digital signal. The data sequence 335 controls the operation of the switch 342 to controllably couple either the capacitor, $C_1$, or the capacitor, $C_2$, to the resonator 310, i.e., to controllably load the resonator 310 with either the capacitor, $C_1$, or the capacitor, $C_2$. Controllably coupling the capacitor, $C_1$ causes the resonator 310 to resonate at a first frequency, $f_1$. Controllably coupling the capacitor, $C_2$ causes the resonator 310 to resonate at a second frequency, $f_2$. By controlling the coupling of the capacitor, $C_1$, and the capacitor, $C_2$, with the resonator 310, the tuning circuit 340 is a time-variant capacitor.

It is to be understood that although the circuit model 300 is illustrated in FIG. 3 and described herein as incorporating a time-variant capacitor, other embodiments of the circuit model 300 in which the element 340 is a time-variant inductor are contemplated. In an exemplary embodiment, the resonator 310 is a high Q resonator.

With continued reference to FIG. 3, the circuit model 300 demonstrates an exemplary embodiment of the present invention. A high Q resonator 310 is loaded with two capacitors, $C_1$ and $C_2$, through a single pole-double throw switch 342 controlled by data sequence 335. Two frequencies, $f_1$ and $f_2$, associated with different capacitance levels, $C_1$ and $C_2$, are generated by switching between capacitors.

Switching a reactive component, e.g., the capacitors, $C_1$ and $C_2$, in the network 300 rearranges the location of the poles in the resonator 310 and hence, one should expect a variation in damping factor and resonant frequency after the switching instance. Since the input reactance of the switched resonator 310 changes due to the change of a reactive component, e.g., capacitors, $C_1$ and $C_2$, the resonator 310 will be tuned out with respect to the source frequency $f_1$ and the input impedance deviates from the matching condition.

Figure 4A:
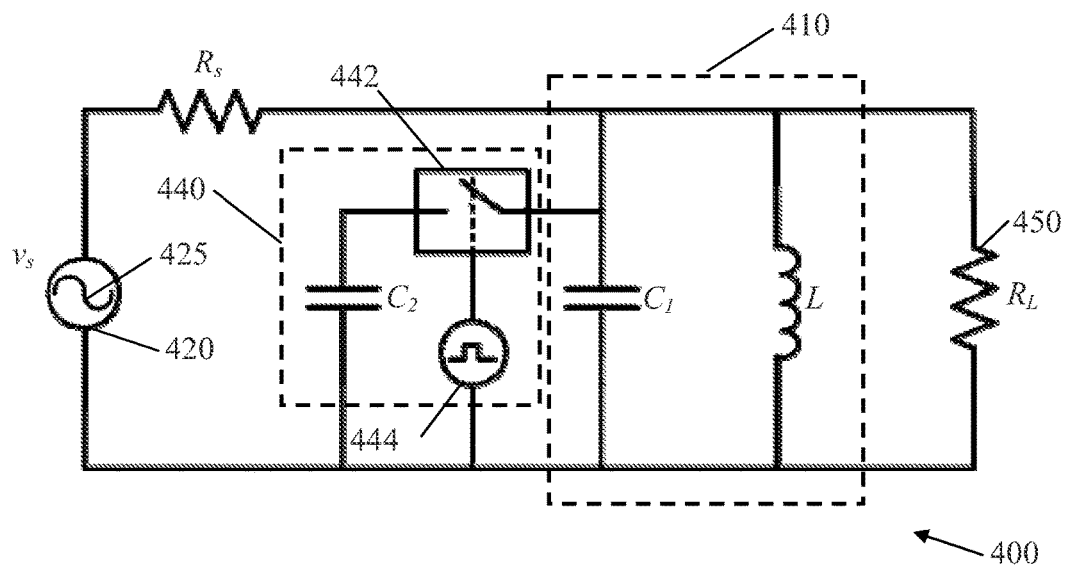
FIGS. 4A-4C illustrates an exemplary equivalent circuit model of the circuit of FIG. 2 in which the antenna of FIG. 2 is represented by an equivalent resonator in FIGS. 4A-4C, the equivalent circuit model of FIGS. 4A-4C comprising a tuning circuit comprising a capacitor that is controllably switched into and out of (coupled into and decoupled from) the circuit, FIGS. 4A-4C more specifically illustrating the equivalent circuit model depending on the state of the coupling of the capacitor into the circuit, in accordance with an exemplary embodiment of the present invention.

Referring now to FIG. 4A, there is illustrated an exemplary embodiment of a portion of the circuit 300, which exemplary embodiment is generally designated as 400 in FIG. 4, in accordance with an exemplary embodiment of the present invention. The circuit 400 comprises a first capacitor, $C_1$, an inductor, L, a load, $R_L$ (corresponding to the load 350 of FIG. 3), a source, $V_S$ (corresponding, to the source 320 of FIG. 3), having a source impedance, $Z_0$, and a tuning circuit 440. In the circuit model 400, the tuning circuit (corresponding to the tuning circuit 340 of FIG. 3) comprises a second capacitor, $C_2$, a switch 442, and a switch controller 444 for controlling the switch 442 for coupling the second capacitor, $C_2$, in parallel with the first capacitor, $C_1$. The first capacitor, $C_1$, is connected in parallel with the source, $V_S$ (also designated as 420 in FIG. 4), which generates a carrier signal 425. The second capacitor, $C_2$, is switched into the circuit 400 by way of the switch 442 in FIG. 4. The source impedance, $Z_0$, is represented by a resistor, $R_S$, in FIG. 4A.

The inductor, L, and the first capacitor, $C_1$, are in parallel in the circuit 400 and form a resonator 410 (corresponding to the resonator 310 of Ha 3). The inductor, L, and the capacitor, $C_1$, or combined $C_1+C_2$, when the capacitor, $C_2$, is coupled into the circuit 400, form an LC-tank depending on the position of the switch 442. The LC-tank is coupled to the resistor, $R_L$, which is in parallel with the resonator 410. The load resistor, $R_L$, and the LC-tank together form an RLC circuit. The source 420 generates a carrier signal 425, which is a single-tone sinusoidal signal $v_{inc}(t)$ incident to an input 411 of the resonator 410.

Figure 4B:
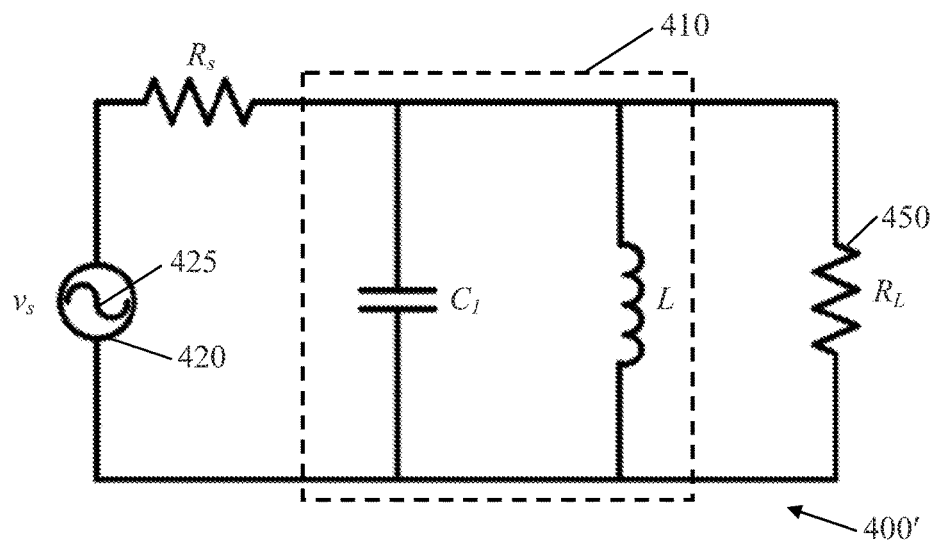

When the switch 442 is open, the capacitor, $C_1$, is in the circuit 400, but the capacitor, $C_2$, is not. The topology of the circuit 400 may be simplified by showing no capacitor, $C_2$, or switch 442 when the switch 442 is open. Such topology is illustrated in FIG. 4B and is generally designated as circuit 400', in accordance with an exemplary embodiment of the present invention. The circuit 400' comprises: the resonator 410 (corresponding to the resonator 410 of FIG. 4A) comprising the inductor, L, and the capacitor, $C_1$; and the load 450 comprising the resistor, $R_L$.

With reference to FIG. 4B, when the switch 442 is open, the incident signal 425 has a frequency at the resonance frequency of the resonator 410, i.e., $\omega_{01}=1/\sqrt{LC_1}$, which can be expressed as $f_1 = 1/2\pi\sqrt{LC_1}$. The source 420 is a matched source in which $R_L = R_S$ at frequency, $f_1$. Because the load, $R_L$, is matched to characteristics impedance, $Z_0$, of the source 420, the reflection coefficient at the input port 411 is zero and voltage at the load, $R_L$, is:

$$v_R(t) = v_{inc}(t), (t < t_s) \qquad 12.$$

Referring again to FIG. 4A, at $t=t_s$, because $C_2$ is switched into the circuit, the resonant frequency of the LC-tank changes to $f_2 = 1/2\pi\sqrt{L_1(C_1+C_2)}$. Thus, the new input reactance becomes zero, and hence, the source impedance, $Z_0$, will be mismatched with respect to the input impedance, $Z_{in}$, of the new circuit topology, and part of the signal 425 reflects back to the source 420.

The voltage at the load resistor, $R_L$, and the current at the input 411 for $t > t_s$ can be expressed as sum of the incident signal $v_{inc}(t)$ and the reflected signal $v_{ref}(t)$ as:

$$v_R(t) = v_{inc}(t) + v_{ref}(t). \qquad 13$$

$$i_{in}(t) = \frac{1}{Z_0}[v_{inc}(t) - v_{ref}(t)]. \qquad 14$$

Eliminating $v_{ref}(t)$ from (13) and (14), the load voltage in terms of input current and incident signal can be expressed as:

$$v_R(t) = 2v_{inc}(t) - Z_0 i_{in}(t) \qquad 15.$$

where:

$$i_{in}(t) = i_C(t) + i_L(t) + i_R(t) \qquad 16.$$

$i_C(t)$ represents the current in the switched capacitors $C_1$ and $C_2$. Since capacitance is time-varying, the relation between voltage and current for $C_2$ and $C_2$ can be written as:

$$i_C(t) = \frac{dq(t)}{dt} = C(t)\frac{dv_R}{dt} + v_R(t)\frac{dC(t)}{dt}. \qquad 17$$

where $q(t)$ is the total electric charge in the capacitors, $C_1$ and $C_2$. Equation (17) indicates that a step-like variation in the value of the capacitors, $C_1$ and $C_2$, at the switch-ON time, i.e., $C(t)=C_2 U(t-t_s)+C_1$, results in an instantaneous current through the capacitors, $C_1$ and $C_2$, as:

$$i_C(t) = C(t)\frac{dv_R}{dt} + v_R(t_s) \cdot C_2 \delta(t-t_s). \qquad 18$$

Equation (18) describes the presence of an impulsive component in the current, $i_C(t)$, when an ideal switch 442 is applied to the capacitor, $C_2$. The magnitude of this impulsive component is a function of instantaneous voltage across the capacitors, $C_1$ and $C_2$, and the value of the switched capacitor, $C_2$.

At the switch-ON time $t_s$, electric charge continuity implies:

$$q(t_s^+) = q(t_s^-) \qquad 19.$$

or:

$$C_1 v_R(t_s^-) = (C_1 + C_2) v_R(t_s^+) \qquad 20.$$

Therefore, the voltage at the load, $R_L$, right after the switching instant can be expressed as:

$$v_R(t_s^+) = \frac{C_1}{C_1 + C_2} v_R(t_s^-). \qquad 21$$

This discontinuity in the load voltage results in a discontinuity in stored energy in the resonator 410. To satisfy electric charge continuity, an instant reduction in stored electric energy occurs in the LC-tank 410 right at the switching moment. The ratio of this energy reduction can be written as:

$$\frac{\mathcal{E}_e(t=t_s^+)}{\mathcal{E}_e(t=t_s^-)} = \frac{\frac{1}{2}(C_1+C_2)v_C^2(t_s^+)}{\frac{1}{2}C_1 v_C^2(t_s^-)} = \frac{1}{1+\frac{C_2}{C_1}}. \qquad 22$$

This reduction in stored electric energy is a result of a voltage drop at $R_L$ at the switching moment, $t_s$, which is necessary to satisfy the continuity of electric charge. For a larger switched capacitor, $C_2$, the energy reduction will be more significant. However, if the switching time is synchronous with the zero crossing time of the incident signal, i.e. if $v_C(t_s)=0$, then at the switching instant instantaneous electric charge in the capacitors $C_1$ and $C_2$ is zero, and all stored energy is accumulated in the inductor, L, in the form of magnetic energy. Therefore, the energy stored in the LC-tank will be preserved and will not be disturbed by the switching procedure. This energy is dissipated in the resistive load, $R_L$, after switching.

For $t > t_s$, the voltage at the load, $R_L$, comprises two frequency components. The first component is a leakage from the incident signal 325 at a frequency, $\omega_{01}=1/\sqrt{LC_1}$, which is mismatched to the input impedance, $Z_{in}$, of the resonator 410. The magnitude of this component is dictated by the mismatch factor. The second frequency component, $\omega_{02}$, is due to a transient response produced by initial conditions of the inductor L and capacitors, $C_1$ and $C_2$, in a source-free RLC circuit. Since shifting the stored energy into the frequency $\omega_{02}$ after the switching instant is of interest, leakage from the incident signal 325 should be minimized. Maximum mismatch can be achieved by choosing the capacitor, $C_2$, such that $\omega_{02}$ is far enough from $\omega_{01}$.

Alternatively, if the resonator 310 has a high Q factor and a bandwidth that is sufficiently narrow, a large mismatch factor can be achieved by a small frequency deviation. It can be shown by solving the differential equation of the circuit 400. If the incident signal 435 is $v_{inc}(t)=V_s \sin(\omega_{01}t)$ and total capacitance is represented by $C_{tot}=C_1+C_2$ such that $\omega_{02}=1/\sqrt{LC_{tot}}$, leakage voltage at the load, $R_L$, can be expressed as:

$$v_{leak}(t) = \frac{V_s}{\sqrt{1+I^2}} \sin(\omega_{01}t - \tan^{-1}I). \qquad 23$$

where:

$$I = Q \cdot \frac{\omega_{01}^2 - \omega_{02}^2}{2\omega_{01}\omega_{02}}. \qquad 24$$

Q is calculated at frequency $\omega_{02}$. Equation (24) denotes that the magnitude of the leakage signal at source frequency $\omega_{01}$ is proportional to the Q factor of the resonator 420 multiplied by the difference of the squares of the resonant frequencies. As discussed above, for a high Q resonator, the source 435 is well isolated from the load 450 after switch-ON time, and the only significant component at the load 450 is $\omega_{02}$.

Figure 4C:
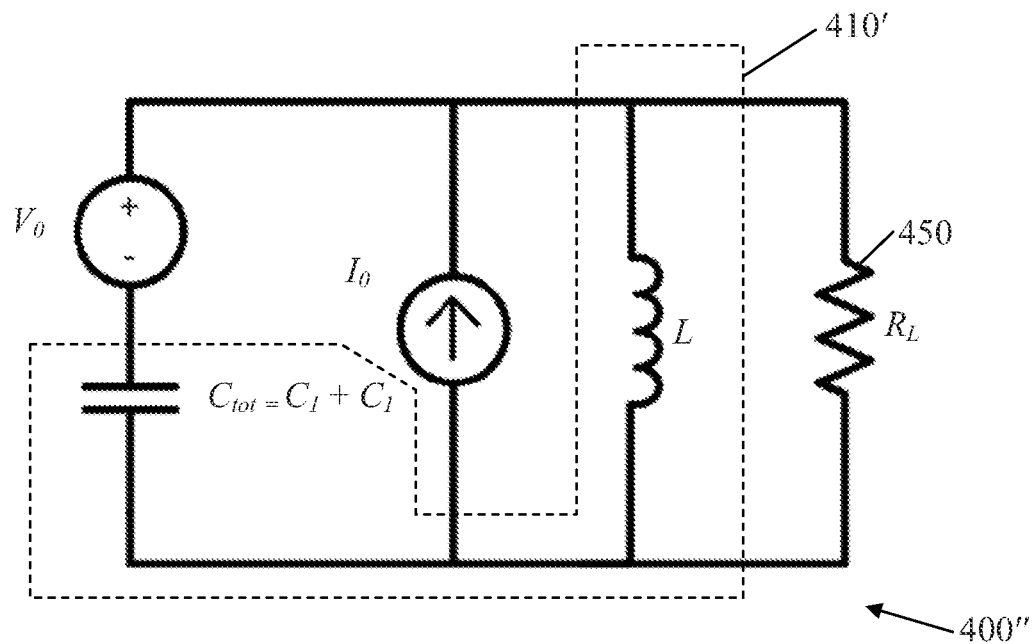

If the mismatch factor between the source 420 and the input impedance, $Z_0$, of the new circuit topology is high enough, the source 420 will be totally isolated from the resonator 410. However, the stored energy in the capacitor, $C_1$, and the inductor, L, before the switching instance will be discharged to the load 450 at a different frequency which is determined by the switched capacitor, $C_2$. FIG. 4C illustrates the equivalent topology of the circuit 400 after the switch 442 is closed and the source 420 is isolated from the LC-tank, in accordance with an exemplary embodiment of the present invention.

When the switch 442 is closed, both the capacitor, $C_1$, and the capacitor, $C_2$, are in the circuit 400. The topology of the circuit 400 may be simplified by showing a capacitor, $C_{tot}$, which is equal to $C_1+C_2$. Such topology is illustrated in FIG. 4C and is generally designated as circuit 400", in accordance with an exemplary embodiment of the present invention. In the circuit 400", the capacitor, $C_{tot}$, the inductor, L, and the load, $R_L$, form an RLC circuit. With reference to FIGS. 4A and 4C, the transmission coefficient from the source 420 to the load 450 after the switching instance can be expressed as:

$$|T| = \frac{1}{\sqrt{1+K^2}}; \qquad 25$$
$$\sphericalangle T = -\tan^{-1}K.$$

where:

$$K = Q_2 \frac{f_1^2 - f_2^2}{f_1 f_2}. \qquad 26$$

where $Q_2$ is the new loaded quality factor and is equal to $$\frac{R_L}{2}\sqrt{\frac{C_1+C_2}{L}}.$$

Equations (25) and (26) show that if either the secondary Q factor ($Q_2$) or the difference of the squares of $f_1$ and $f_2$, which is determined by the value of switched capacitor, $C_2$, is sufficiently large such that the power transmission from the source 420 to the load 450 is negligible, the circuit topology 400 after the switching is equivalent to the source-free RLC circuit, as depicted in FIG. 4C.

In the circuit 400", the initial voltage, $V_0$, across the capacitor, $C_{tot}(=C_1+C_2)$, is calculated using the continuity of electric charge as shown in equation (27):

$$V_0 = v_R(t_s^+) = \frac{C_1}{C_1+C_2} v_R(t_s^-). \qquad 27$$

The initial current, $I_0$, can be also obtained using continuity of magnetic flux $\varphi$ in the inductor, L, as:

$$\varphi(t_s^+) = \varphi(t_s^-) \qquad 28.$$

or:

$$Li_L(t_s^-) = Li_L(t_s^+) \qquad 29.$$

Thus, $$I_0 = i_L(t_s^+) = i_L(t_s^-) \qquad 30.$$

Assuming $t_s$ is synchronous with the zero crossing of the incident signal, 425, initial values are $V_0=0$ and $I_0=1/L\omega_0$. The transient voltage at the load 450 can be found by solving the differential equation for the circuit 400" in FIG. 4C and can be expressed as:

$$v_R(t') = \frac{\omega_{02}^2}{\omega_{01}\omega_d} e^{-\alpha t'} V_s \sin(\omega_d t'). \qquad 31$$

where $t'=t-t_s \cdot \alpha$ and $\omega_d$ are, respectively, an attenuation factor and a damped resonant frequency for the RLC circuit, respectively and can be calculated as:

$$\alpha = \frac{\omega_{02}}{2Q}; \quad \omega_d = \omega_{02}\sqrt{1-\frac{1}{4Q^2}}. \qquad 32$$

For a high Q resonator (Q>>1), the damped resonant frequency can be approximated by steady state resonant frequency $\omega_{02}=1/\sqrt{L(C1+C2)}$:

$$\omega_d \approx \omega_{02} \qquad 33.$$

and the transient voltage at the load 350 can be expressed as:

$$v_R(t') \approx \frac{\omega_{02}}{\omega_{01}} e^{-\frac{\omega_{02}}{2Q}t'} V_s \sin(\omega_{02}t'). \qquad 34$$

Equation (34) depicts that if $t_s$ coincides with the zero-crossing of incident signal, $v_{inc}$, the first peak after switching occurs at $t=t_s+T'/4$ and takes a value of $$\frac{\omega_{02}}{\omega_{01}} e^{-\frac{\pi}{4Q}}$$

that can be approximated by $$\frac{\omega_{02}}{\omega_{01}}$$

or a high Q resonator. For a non-zero initial value, the first peak occurs at $t_s^+$ and its value is $$\frac{C_1}{C_1+C_2} = \left(\frac{\omega_{02}}{\omega_{01}}\right)^2.$$

Since $\omega_{02} < \omega_{01}$, the initial energy transferred to frequency $\omega_{02}$ for the zero initial condition is the forth power of the case of non-zero initial conditions. Total dissipated energy for $t > t_s$ can be calculated as:

$$E_{diss} = \frac{1}{R}\int_0^\infty v_R^2(t')dt' = \frac{1}{R}\left(\frac{\omega_{02}}{\omega_{01}}\right)^2 V_s^2 \frac{2Q^3}{\omega_{02}(1+4Q^2)} \approx \frac{1}{R}\left(\frac{\omega_{02}}{\omega_{01}}\right)^2 V_s^2 \frac{Q}{2\omega_{02}}.$$

Replacing $$\frac{Q}{\omega_{02}} \text{ and } \left(\frac{\omega_{02}}{\omega_{01}}\right)^2$$

with R(C1+C2) and $$\frac{C1}{C1+C2},$$

respectively, yields:

$$E_{diss} = \tfrac{1}{2} C_1 V_s^2 \qquad 36.$$

Equation (36) indicates that total dissipated energy in the load 425 after switching instant is equal to the stored energy before switching. Thus, if switching occurs when the instantaneous voltage, $V_0$, across the capacitor, $C_1$, is zero, the entire stored energy will be dissipated in the load 325 and there will be no energy reduction.

With respect to FIG. 4C, the decay rate for the source-free frequency component depends on the Q factor of the resonator 410'. For a high Q resonator 410', switching between source and secondary frequencies can be achieved by using a pulse train as the switching control signal 444 to modulate the frequency of the resonator 410, 410'. As discussed in previously, in order to preserve the stored energy, switching should be synchronous with zero-crossings of both frequency components, $f_1$ and $f_2$. Therefore, both resonant frequencies, $f_1$ and $f_2$, should be an integer multiplication of switching frequency. Assuming that duty cycle of the modulating pulse signal 444 is 50%, each pulse represents a pair of 0 and 1 with symbol duration of $T_s/2$, where $T_s$ is the pulse period. In order to generate orthogonal signals, separation between frequencies should be an integer multiplication of the switching frequency $f_s=1/T_s$. For the resonator in FIG. 4A, examples of switch frequencies that meet all the mentioned considerations are 10, 20, 40, 50 and 100 MHz.

As noted above, a single-mode small antenna can be modeled by an RLC resonator that mimics the antenna in both time and frequency domain. Therefore, the switched-capacitor technique described above with respect to FIGS. 3 and 4A-4C can be applied to a small antenna in order to realize a high bit-rate direct FSK modulation.

Figure 5:
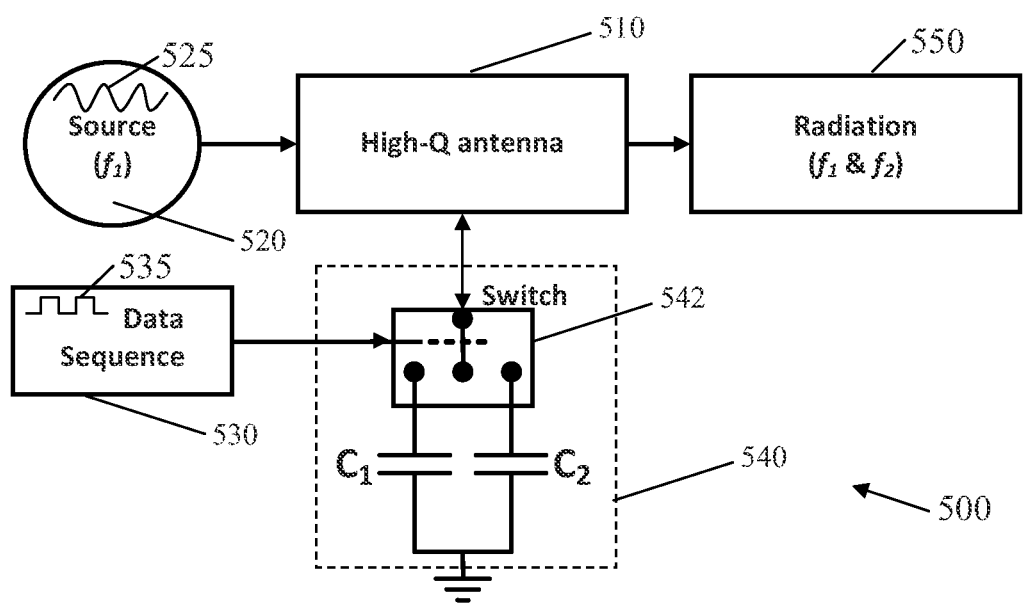
FIG. 5 illustrates an exemplary embodiment of the circuit of FIG. 2 in which the tuning circuit comprises a pair of capacitors, in accordance with an exemplary embodiment of the present invention.

Referring now to FIG. 5, there is illustrated a model of a circuit, generally designated as 500, for tuning a small antenna 510, in accordance with an exemplary embodiment of the present invention. The circuit model 500 comprises a resonator 510, a carrier generator 520, a data sequence 530, a tuning circuit 540, and a radiated signal 550. The antenna 510 is an electric antenna. The circuit 500 is an exemplary implementation of the circuit 200 and may include any of the exemplary features of the circuit 200 described above.

The tuning circuit 540 is configured for changing a resonance frequency of the antenna 510. Because the antenna 510 is an electric antenna, the tuning circuit 340 comprises a switch 542, a first capacitor, $C_1$, and a second capacitor, $C_2$. In an exemplary embodiment, the switch 542 is a semiconductor switch. The resonator 510 corresponds to the resonator 310 of FIG. 3; the carrier generator 520 corresponds to the carrier generator 320 of FIG. 3; the data sequence 530 corresponds to the data sequence 330 of FIG. 3; the tuning circuit 540 corresponds to the tuning circuit 340 of FIG. 3; and the radiated signal 550 corresponds to the load 350 of FIG. 3. The descriptions of these elements of FIG. 3 are incorporated by reference into the descriptions of their corresponding elements of FIG. 5.

Because the RLC resonator 310 models the antenna 510, the first capacitor, $C_1$, and the second capacitor, $C_2$, of FIG. 5 are switched into the circuit 500 by the switch 542 to tune the antenna 510 at $f_1$ and $f_2$, respectively, in a similar way which the first capacitor, $C_1$, and the second capacitor, $C_2$, of FIG. 3 are switched into the circuit 300 by the switch 342 to tune the resonance frequency of the resonator 310. For reasons similar to those discussed with respect to FIGS. 3 and 4A-4C, if switching of the second capacitor, $C_2$, into the circuit 500 occurs when an instantaneous voltage, $V_0$ (corresponding to the instantaneous voltage, $V_0$ in FIG. 4C) applied to the first capacitor, $C_1$, is zero, the entire energy stored in the near field of the antenna will return to the near field in the next half cycle of the carrier 525, and there will be no energy reduction.

The purpose of employing the switched-capacitor technique to create a direct antenna modulation is to decouple the data-rate from the antenna 510 bandwidth similar to the resonator 310. Starting at t=0, $C_1$ loads the antenna and reactive energy begins to build up at frequency $f_1$. A portion of the energy is stored in $C_1$ and the rest is stored in the near zone of the antenna 510. At the moment of zero-crossing of the capacitor, $C_1$, voltage, the switch 542 changes its state to connect $C_2$ and shifts the fundamental natural resonance of the antenna 510 to $f_2$. Hence, the antenna 510 will operate in the transient mode, and the radiating fields 550 shift to $f_2$.

Since the capacitor, $C_1$, does not face a voltage discontinuity, the stored electric energy is not disturbed and if the capacitor is high-Q, the entire stored energy is preserved until the next cycle of charging. Depending on time constant of the fundamental resonance of the antenna 510, after several cycles stored energy in the near-field and capacitor, $C_1$ or $C_2$, builds up to its maximum. During the transient operation of the antenna 510, the stored energy within the near-field decays slightly and provides the radiative power. The amount of energy decay depends on the Q factor of the antenna 510. Therefore, if the antenna 510 has a high Q, the total amount of near-field stored energy will not change dramatically, and the bandwidth of the antenna 510 will be decoupled from the stored energy 520, i.e. any abrupt variation in the surface current distribution will appear in the far-field momentarily (transmission delay is ignored). By using a pulse 535 train as the switch control signal where a pair of "0" and "1" can be represented by each pulse cycle, $f_1$ associated with $C_1$ represents a "1" and $C_2$ associated with $f_2$ represents a "0".

Figure 11A:
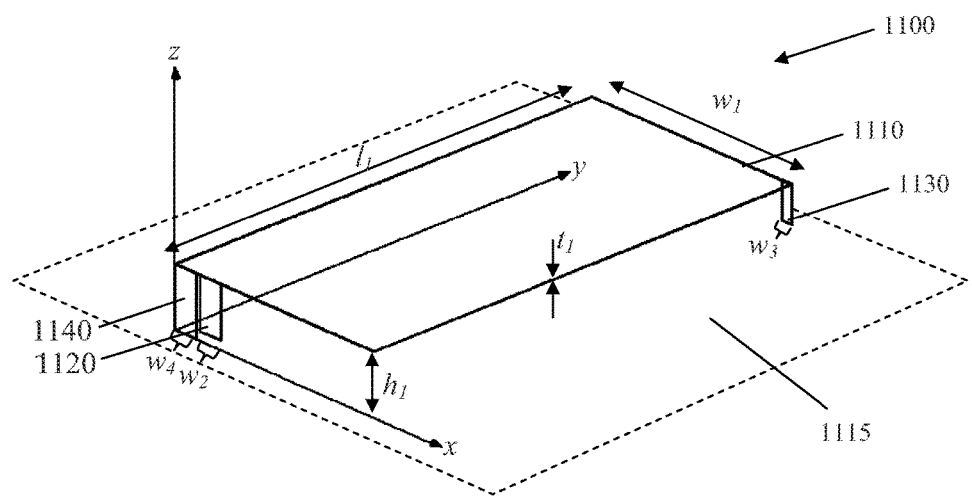
FIGS. 11A and 11B illustrate exemplary embodiments of the antennas of FIGS. 2 and 5, in accordance with an exemplary embodiment of the present invention.

FIG. 11A illustrates such an exemplary embodiment of the antenna 210, 510, generally designated in FIG. 11A as 1100, in accordance with an exemplary embodiment of the present invention. Thus, in an exemplary embodiment, it is contemplated that the antenna 1100 may be used in the circuit 200 or 500 as the antenna 210 or 510, respectively. The antenna 1100 is an I-tunable Planar Inverted-F Antenna (PIFA).

The antenna 1100 comprises a body 1110, a feeding port 1120, a tuning port 1130, a shorting pin 1140, and a substrate 1115 on which the antenna body 1110 is mounted. The substrate 1115 is a ground plane. When used in the circuit 500, the tuning port 1130 is coupled to the tuning circuit 540, and the feeding port 1120 to the source 525.

The body 1110 has a width, $w_1$, a length, $l_1$, and a thickness $t_1$. The antenna body 1110 and is mounted to the substrate 1115 at a height $h_1$ above the substrate 205. In the exemplary embodiment of the antenna illustrated in FIG. 11A, the body 1110 is parallel to the substrate 1115. It is to be understood that the antenna body 1110 need not be parallel to the substrate 1115. Other embodiments in which the antenna body 1110 is sloped relative to the substrate 1115 are contemplated.

Attached to the antenna body 1110 at a first corner are the feeding port 1120 and the shorting pin 1140. The shorting pin 1140 is also connected to the ground plane 1115 to thereby electrically couple the antenna body 1110 to the ground plane 1115. Attached to the antenna body 1110 at a second corner opposite the first corner is a tuning port 1130. The feeding port 1120 and the tuning port 1130 are not attached to the ground plane. Instead, they are respectively coupled to tuning circuitry and an RF source, such as the tuning circuit 540 and the source 525, respectively, of FIG. 5.

Each of the feeding port 1120, the tuning port 1130, and the shorting pin 240 has a height, l, equal to the distance between the antenna body 1110 and the substrate 1115. The feeding port 1120 has a width, $w_2$, the tuning port 1130 has a width, $w_3$, and the shorting pin 1140 has a width $w_4$. In the exemplary embodiment illustrated in FIG. 11A, the widths, $w_2$ and $w_4$, are equal, but it is to be understood that in other embodiments of the antenna 1100 they need not be equal.

Figure 11B:
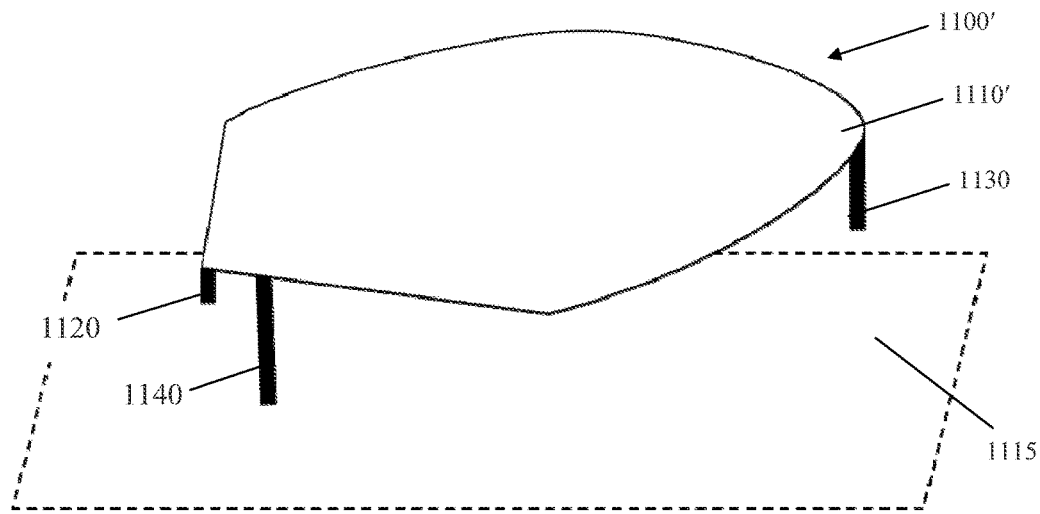

In the exemplary embodiment of the antenna illustrated in FIG. 11A, the body 1110 is of a rectangular shape. Other shapes of the body 1110, however, are contemplated. Illustrated in FIG. 11B is an exemplary alternative embodiment of the antenna 1100, generally designated in FIG. 11B as 1100', in accordance with an exemplary embodiment of the present invention. The antenna 1100' differs from the antenna 1100 in that it has a non-rectangular body 1110.

Referring again to FIGS. 3 and 5, although it is mentioned above that an antenna may be represented by an RLC circuit, in contrast with the resonator 310, the antenna 510 may excite higher order modes. Even though the higher order modes have larger damping factors, part of the input power may couple to these modes and high-order resonances appear in the radiated fields. A small antenna typically excites the fundamental mode. However, for switching applications, an antenna structure with only one excited natural resonance is required.

Recently, an electrically-coupled loop antenna (ECLA) has been introduced as a dual for a planar inverted-F antenna (PIFA). Since an ECLA uses an electrically coupled feeding mechanism, further impedance matching is not required, and the antenna can be highly miniaturized. As a result, the antenna can operate at a single resonance with a very high Q factor. In addition, an ECLA shows excellent radiation efficiency compared to its counterpart, PIFA. These considerations make the ECLA a suitable choice for the modulation techniques described herein.

Figure 12A:
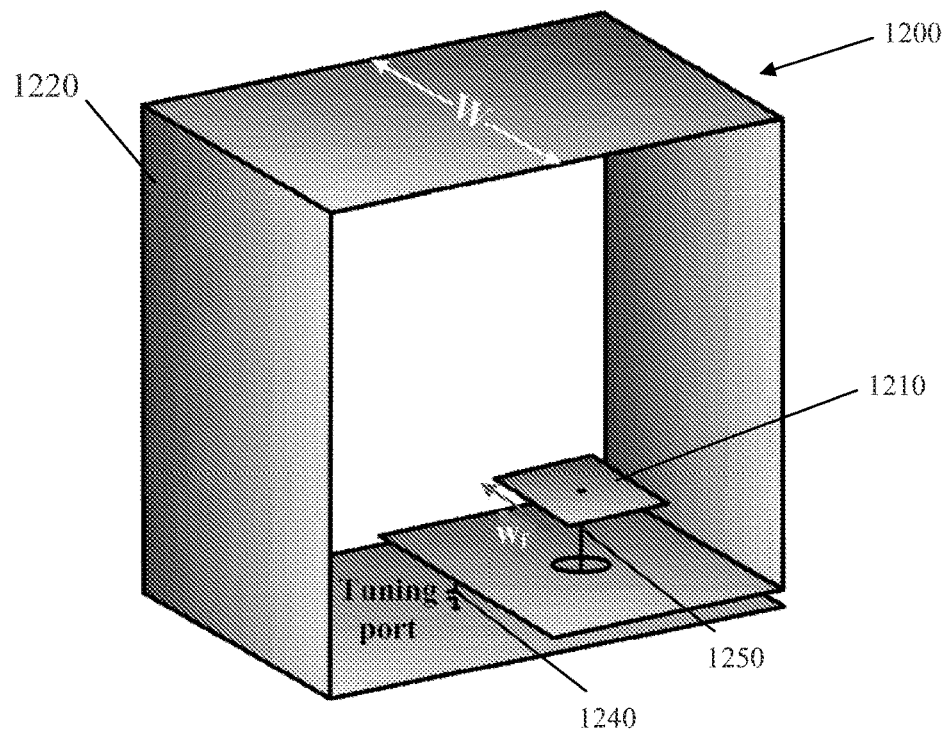
FIGS. 12A and 12B illustrate perspective and front views an electrically-coupled loop antenna (ECLA), in accordance with an exemplary embodiment of the present invention.
Figure 12B:
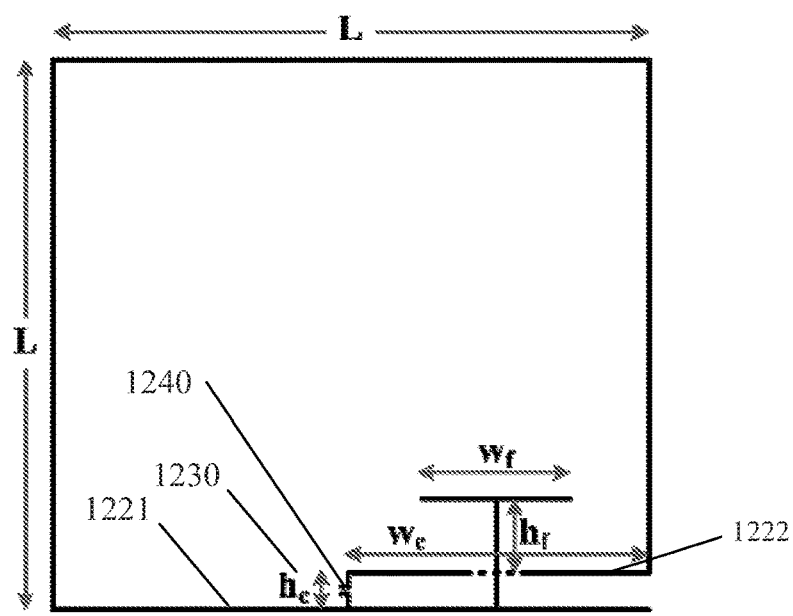

Referring now to FIGS. 12A and 12B, there are illustrated perspective and front views the structure of an ECLA, generally referred to as 1200, in accordance with an exemplary embodiment of the present invention. In an exemplary embodiment, it is contemplated that the antenna 1200 may be used in the circuit 200 or 500 as the antenna 210 or 510, respectively.

The antenna 1200 is fed via a capacitive plane (also referred to as a "capacitive patch") 1210 having dimensions, $w_f$ by $w_f$. The capacitive plane 1210 which is used to match the input impedance of the antenna 1200. The antenna 1200 is formed from a loop conductor 1220, having dimensions L×L×W.

The loop conductor 1210 resonates along with a tunable capacitive gap 1230 having a height, $h_c$. The tunable capacitive gap 1230 is formed between first and second lower arms 1221, 1222 of the loop 1220 that overlap over a length, $w_c$, of the second lower arm 1222. The tunable capacitive gap 1230 tunes the resonant frequency of the antenna 1210 and miniaturizes the antenna 1210. In order to change the resonant frequency, a tuning port 1220 is located at the edge of the capacitive gap 1230. A switched capacitor, such as the capacitors, $C_1$ and $C_2$, of FIG. 5, can be placed in parallel with the capacitive gap 1240 and contribute to the natural resonance of the antenna 1200. When used in the circuit 500, the tuning port 1030 is coupled to the tuning circuit 540.

A feeding port 1250 connects the capacitive patch 1210 to the first lower arm 1221 of the loop 1220. An RF source, such as the source 525 of FIG. 5, powers the antennal 1200 via the feeding port 1250. The feeding port 1250 has a height of $h_f + h_c$.

Figure 6A:
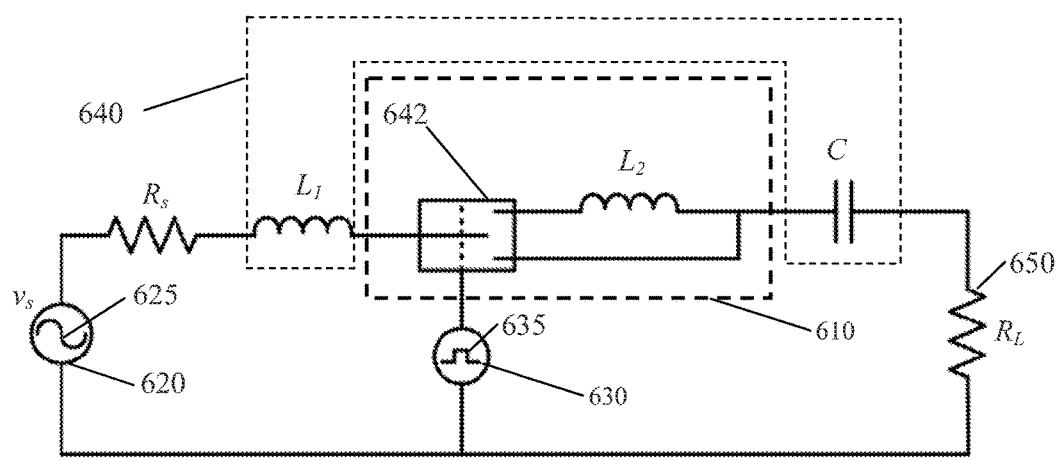
FIG. 6A illustrates an exemplary equivalent circuit model of the circuit of FIG. 2 in which the antenna of FIG. 2 is represented by an equivalent resonator in FIG. 6A, the equivalent circuit model of FIG. 6A comprising a tuning circuit comprising an inductor, in accordance with an exemplary embodiment of the present invention.

As noted above, in one exemplary embodiment of the circuit 200, the antenna 210 is an electric antenna, and the tuning circuitry 240 is capacitative. The exemplary circuit 500 illustrated in FIG. 5 and the antennas 1000 and 1200 follow this embodiment. In another exemplary embodiment of the circuit 200, the antenna 210 is a magnetic antenna, and the tuning circuitry 240 is inductive. An exemplary implementation of this embodiment is illustrated in a circuit, generally designated as 600, in FIG. 6A in accordance with an exemplary embodiment of the present invention.

The circuit 600 includes similarities with the circuit 400. The circuit 600 comprises a capacitor, C, a first inductor, $L_1$, a load 650, $R_L$ (corresponding to the load 450 of FIG. 4A), a source 620, $V_S$ (corresponding to the source 420 of FIG. 4A), having a source impedance, $Z_0$, and a tuning circuit 640. In the circuit 600, the tuning circuit (corresponding to the tuning circuit 440 of FIG. 4A) comprises a second inductor, $L_2$, and a switch 642 for controllably coupling the second inductor, $L_2$, in parallel with the first inductor, $L_1$. The first inductor, $L_1$, and the capacitor, C, form a resonator 610 (corresponding to the resonator 410 of FIG. 4A).

Switching boundary conditions may be determined by the continuity of magnetic flux within the inductors, $L_1$ and $L_2$.

Either $L_1$ or $L_1+L_2$ contribute to the resonance of the resonator, 610 or resonator 610+$L_2$ at each state of the switch 542. In contrast with the parallel switched capacitor circuit 400 in which the voltage of the capacitor, $C_1$, is the switched parameter, the current is the switched parameter in the series arrangement of the inductors $L_1$, or $L_1+L_2$ in the circuit 600. Therefore, the continuity of magnetic flux is used to find the initial values as follows:

$$\varphi(t_s^+) = \varphi(t_s^-) \quad 37.$$

or $$L_1 i_L(t_s^-) = (L_1+L_2) i_L(t_s^+), \quad 38.$$

thus $$i_L(t_s^+) = \frac{L_1}{L_1+L_2} i_L(t_s^-). \quad 39$$

The drop of current magnitude at the switching instant, $t_s$, imposes a switching loss which appears as a power-drop at the load 650.

Figure 6B:
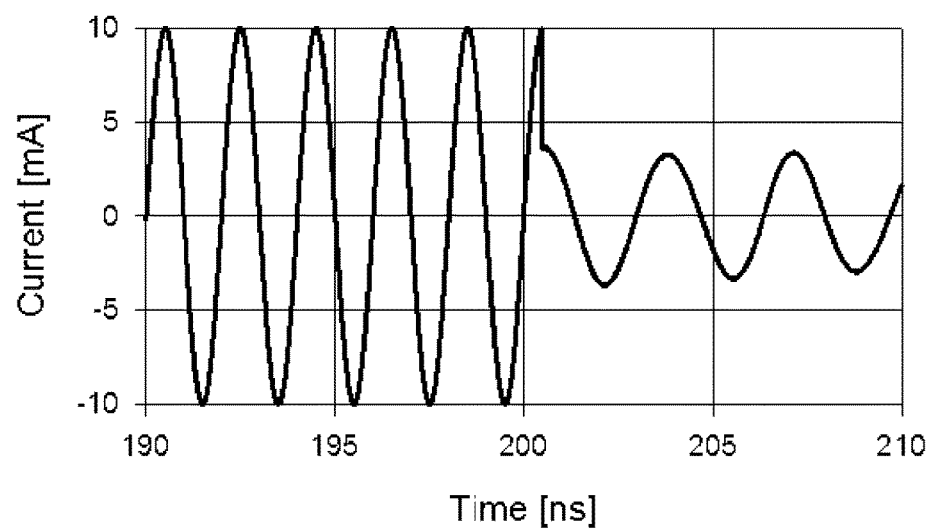
FIG. 6B illustrates a plot of current through the inductor of the tuning circuit of FIG. 6A when it is switched in at the maximum current instant, in accordance with an exemplary embodiment of the present invention.

FIG. 6B shows the current when the inductor, $L_2$, is switched in at the maximum current instant in which the component values are $L_1$=10.014 uH, $L_2$=1.8 uH, C=0.1 pF, and $R_S$=$R_L$=50Ω. These values result in Q factors equal to 63.7 and 106.1, corresponding to resonant frequencies 500 MHz and 300 MHz, before and after the switching.

According to Equation (39), the ratio of currents after and before the switching moment is about 0.36 which can be seen in FIG. 6B. The source voltage, $v_s$, is a 500 MHz sinusoidal with magnitude 1.

Figure 7A:
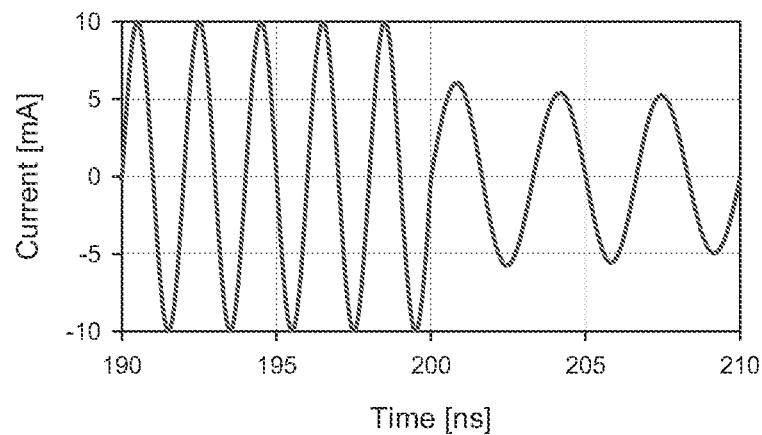
FIG. 7A illustrates a plot of current through the inductor of the tuning circuit of FIG. 6A when it is switched in at the zero current instant, in accordance with an exemplary embodiment of the present invention.
Figure 7B:
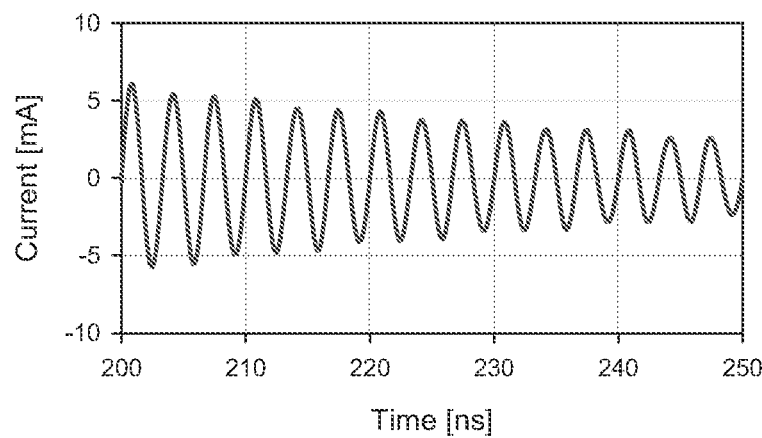
FIG. 7B illustrates a plot of transient current through the inductor after the inductor of the tuning circuit of FIG. 6A is switched, in accordance with an exemplary embodiment of the present invention.
Figure 8A:
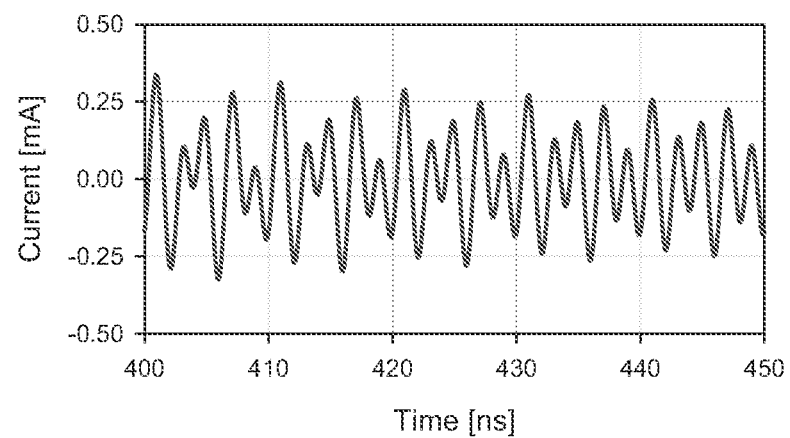
FIG. 8A illustrates a plot showing that leaked current from the source has become noticeable, in accordance with an exemplary embodiment of the present invention.
Figure 8B:
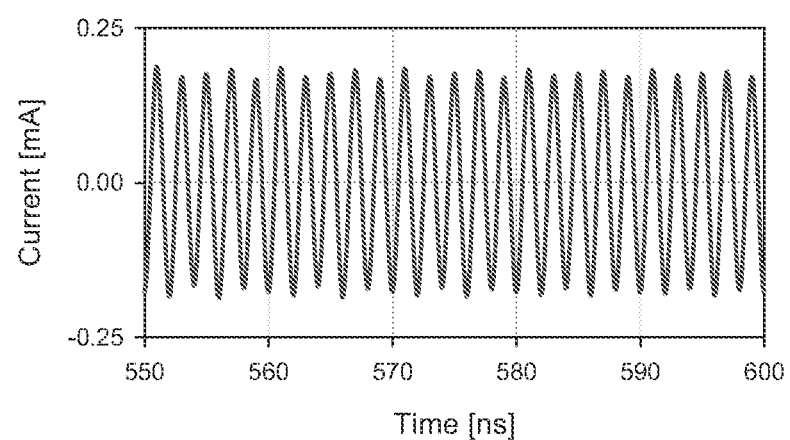
FIG. 8B illustrates a plot showing the leaked current from the source, in accordance with an exemplary embodiment of the present invention.

Analogous to the switched-capacitor circuit 400, switching loss in the switched-inductor circuit 600 can be avoided by synchronizing the switching moment, $t_s$, with the current zero-crossing. FIG. 7A illustrates that at the switching instant, $t_s$, the current waveform changes the frequency from 500 MHz to 300 MHz. The transient current at 300 MHz decays with a damping factor equal to $$\frac{\omega_z}{2Q_z},$$

as illustrated in FIG. 7B. Once its magnitude is small enough, the leaked current from the source 620 at 500 MHz becomes noticeable, as illustrated in FIG. 8A. Eventually, when the transient 300 MHz component completely dies, the only current component is the source leakage at 500 MHz which is a result of impedance mismatch, as illustrated in FIG. 8B.

Figure 25:
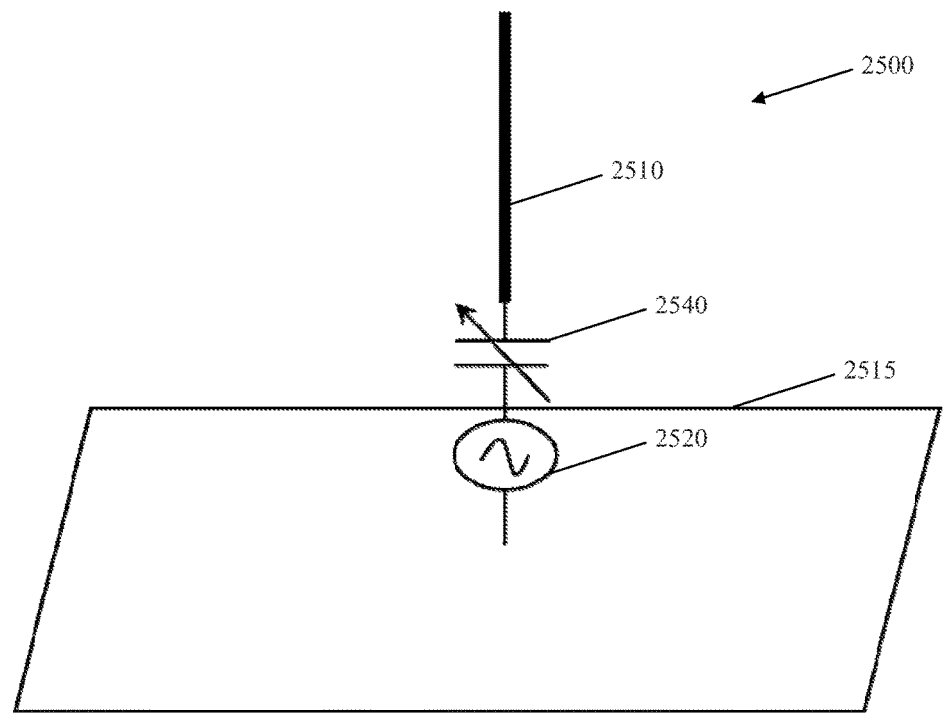
FIGS. 25, 26A, 26B, and 27 illustrate various exemplary embodiments of antennas, in accordance with an exemplary embodiment of the present invention.
Figure 26A:
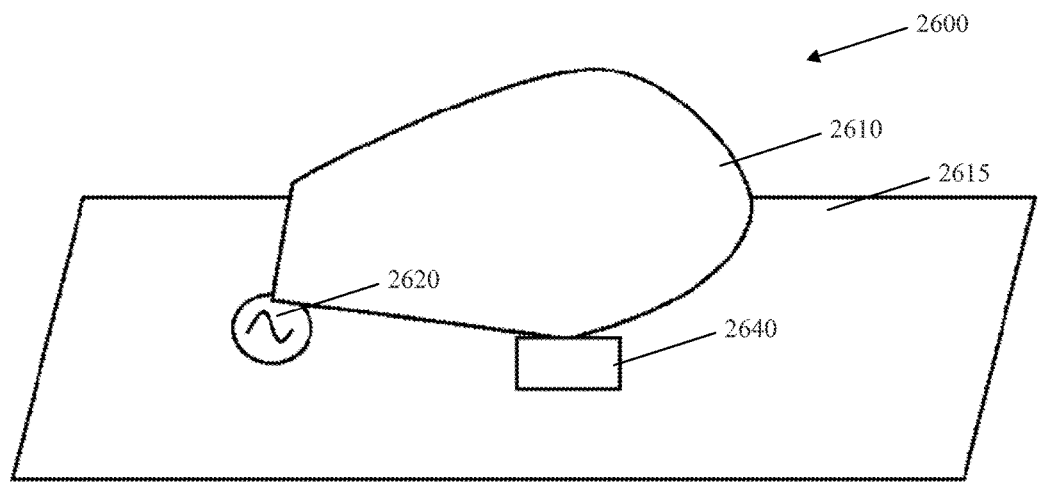
Figure 26B:
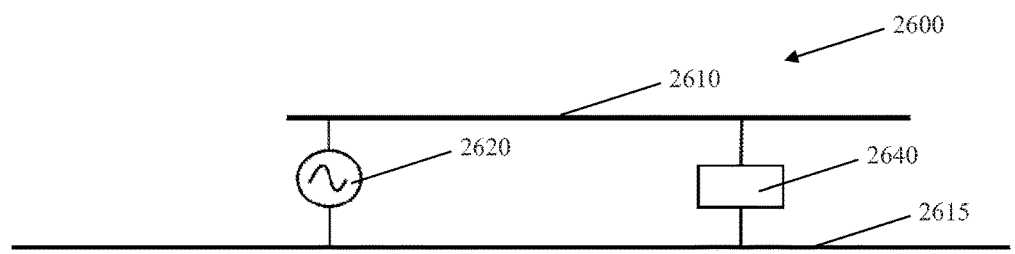
Figure 27:
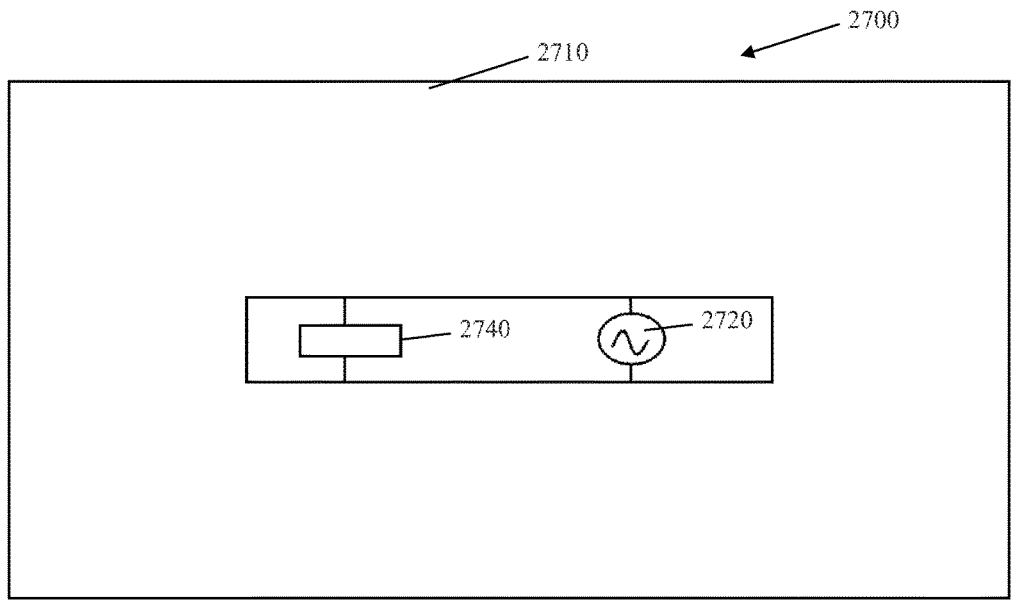

As discussed above, various antennas are contemplated for use as the antenna 210 include a dipole antenna. Examples of the antennas are illustrated in FIGS. 25-27. FIG. 25 illustrates a circuit 2500 comprising a tunable monopole antenna 2510 (corresponding to the antenna 210 of FIG. 2), a source 2520 (corresponding to the source 220 of FIG. 2), a tuning circuit 2540 (corresponding to the tuning circuit 240 of FIG. 2), and a ground plane 2515. FIGS. 26A and 26B illustrate a circuit 2600 comprising a tunable patch antenna 2610 (corresponding to the antenna 210 of FIG. 2), a source 2620 (corresponding to the source 220 of FIG. 2), a tuning circuit 2640 (corresponding to the tuning circuit 240 of FIG. 2), and a ground plane 2615. FIG. 27 illustrates a circuit 2700 comprising a tunable antenna 2710, a slot antenna, (corresponding to the antenna 210 of FIG. 2), a source 2720 (corresponding to the source 220 of FIG. 2), and a tuning circuit 2740 (corresponding to the tuning circuit 240 of FIG. 2).

EXAMPLE 1

A simulation of the circuit 400 was implemented using Agilent Advance Design System. Component values are chosen to have a high Q resonator with two resonant frequencies $f_1$=500 MHz and $f_2$=300 MHz with $Q_1$=119 and $Q_2$=198 before and after the switching of the capacitor, $C_2$, respectively. A single-pole single-throw voltage-controlled switch was used for the switch 442 to switch the capacitor, $C_2$. A step function signal $u(t-t_s)$ was employed to trigger the switch 442 at $t_s$.

Figure 9A:
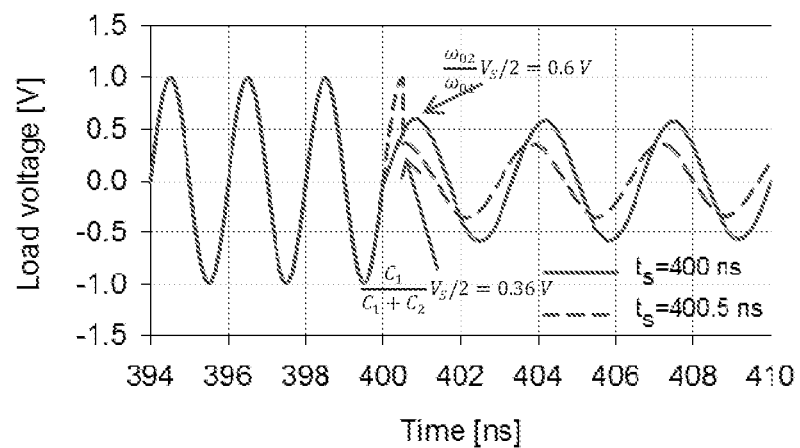
FIG. 9A-9E illustrate various plots resulting from a simulation of the circuit of FIG. 4, in accordance with an exemplary embodiment of the present invention.

The source signal 425 was programmed to be a sinusoidal voltage signal at 500 MHz with an amplitude of 2 V. FIG. 9A shows the voltage at the load, $R_L$, at $t_s$=400 ns and $t_s$=400.5 ns, which correspond to the zero and maximum crossing of the voltage, respectively. As is depicted in FIG. 9A, right after the switching instant the voltage waveform at the load, $R_L$, shifts to the new resonant frequency, 300 MHz. Also, the magnitude of first peaks for each case agrees with predicted value in Equations 21 and 34.

Figure 9B:
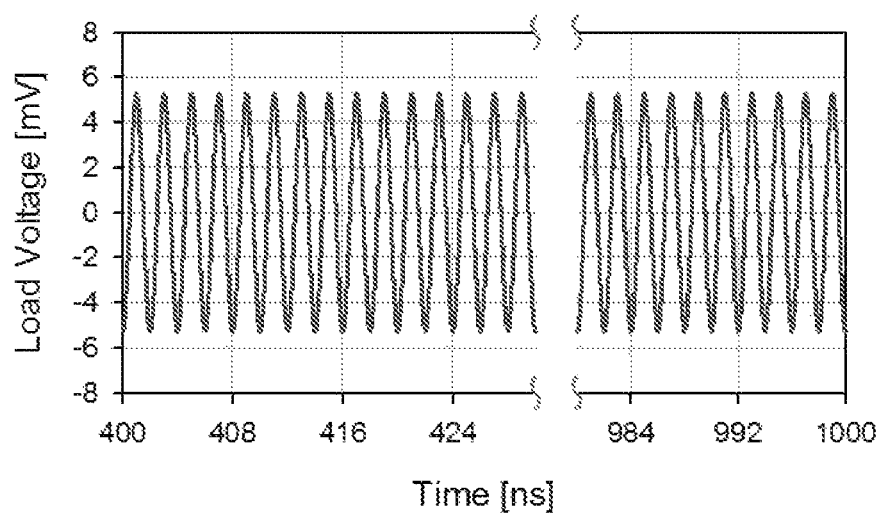
Figure 9C:
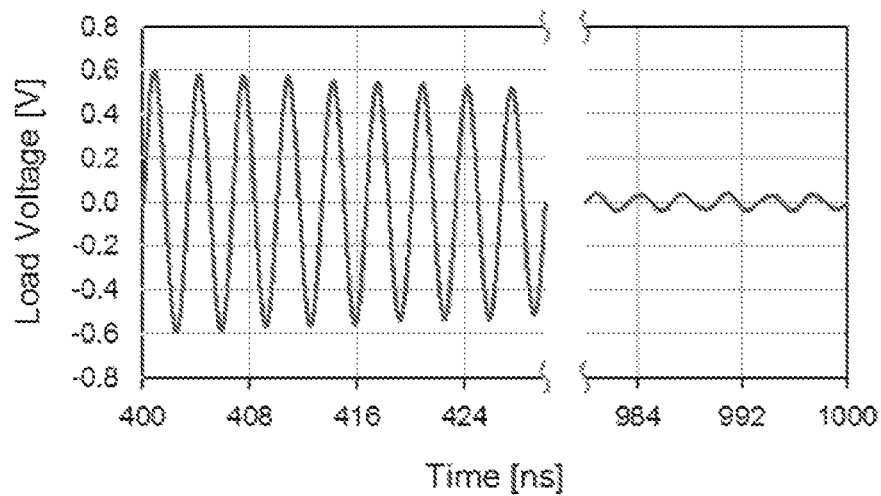

FIGS. 9B and 9C compare the leakage voltage at the source frequency with the second resonant frequency by decomposing the total voltage in frequency domain and taking each component back to the time domain. FIG. 9A illustrates the 500 MHz component of a decomposed voltage at the load, $R_L$, after switching for the resonator 410. FIG. 9B illustrates the 300 MHz component of a decomposed voltage at the load, $R_L$, after switching for the resonator 410.

As predicted in Equation 23, the magnitude of source frequency component after switching is about 5 mV, as illustrated in FIG. 9B. The time constant for the second frequency is $$\tau = \frac{2Q}{\omega_{02}}.$$

Therefore, a fall-time from 90% to 10% of the peak voltage can be calculated as 2.2π≈460 ns that agrees with simulation results, as illustrated in FIG. 9C.

If the fall-time is sufficiently long to maintain enough level of energy during a certain time, switching between two frequencies is achieved according to a sequence of binary bits that trigger the switch 424 and realize a simple FSK modulator. This requires a high Q resonator such that the fall-time is long enough to support the lower limit of required symbol rate.

EXAMPLE 2

Figure 9D:
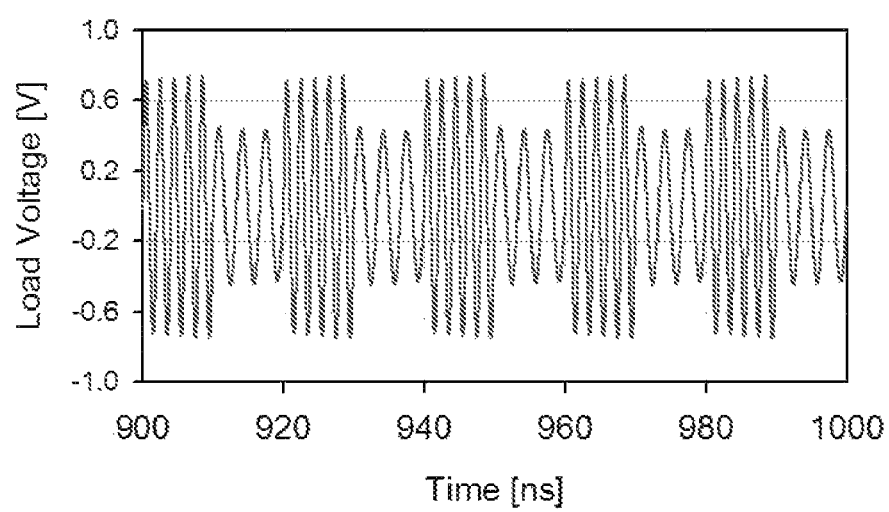
Figure 9E:
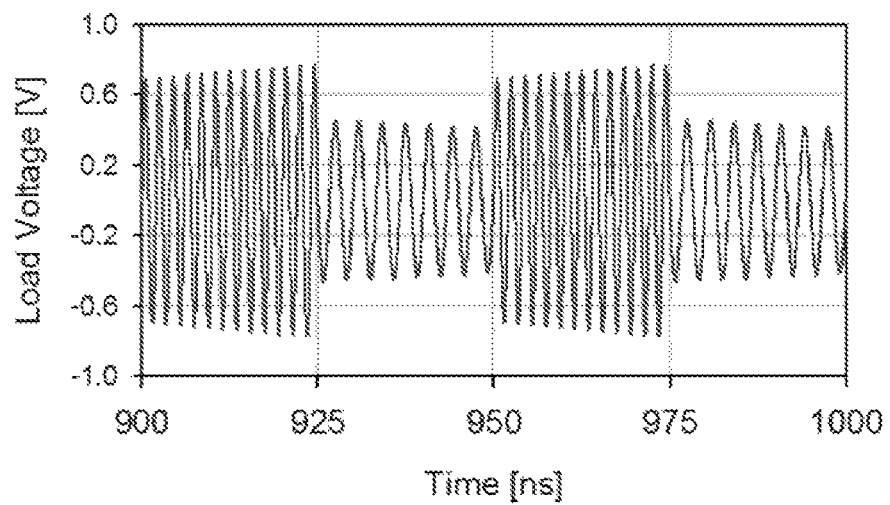

FIGS. 9D and 9E illustrate simulations of FSK signals generated by different switching frequencies of the switch 442, respectively $f_{switch}$=50 MHz and $f_{switch}$=20 MHz. Since each switching pulse represents a pair of 0 and 1, data rate is twice that of the switching frequency. In fact, by using a fast switching mechanism, a simple narrowband RLC resonator, e.g., that of the circuit 400, excited by a single-tone source. e.g., the source 420, can be employed to generate high data rate FSK signals. The mark frequency is same as the source frequency and the space frequency can be tuned by the switched capacitor, $C_2$. Moreover, by using a variable capacitor, such as a varactor diode, for the capacitor, $C_1+C_2$, one can easily tune the space frequency as required.

A mockup of the circuit 400 has been tested. A PIN diode with 9 ns nominal reverse recovery time was used to create a shunt RF switch for the switch 442. The resonator 410+ capacitor, $C_2$, +load, $R_L$, was made of surface mount components with values 2 nF, 3 nF, 1 nH and 50Ω for $C_1$, $C_2$, L, and $R_L$, respectively. An AFG3252 signal generator was used as the switching controller 444 to generate a switching pulse to control the PIN diode, and a VNA (R&S ZVA50) was used as the source 420 to generate the source signal 425. The measured resonant frequencies were about 70 and 115 MHz. The sinusoidal source 425 had a frequency of 70 MHz and input power of 8 dBm.

Figure 10:
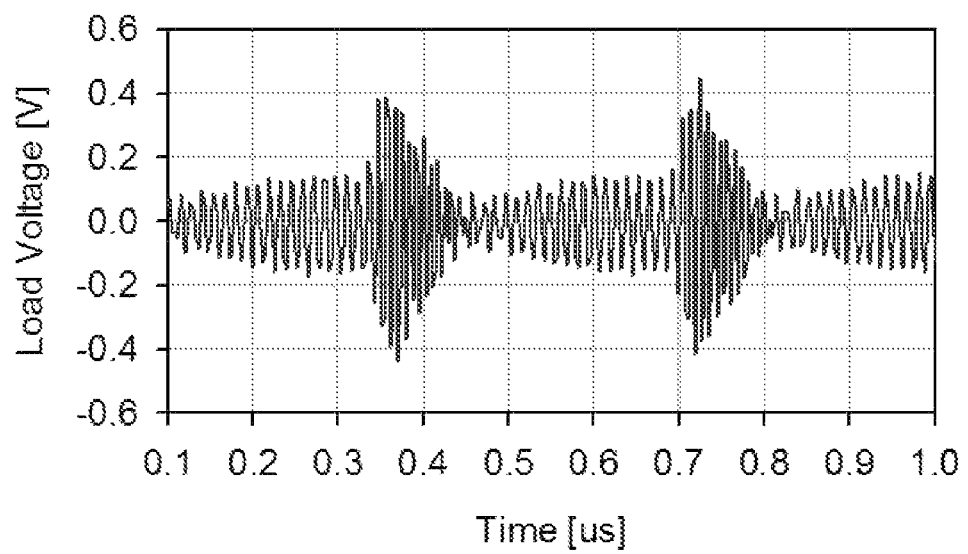
FIG. 10 illustrates a plot of time domain measurement results of a tested mockup of the circuit of FIG. 4, in accordance with an exemplary embodiment of the present invention.

The time domain signals are measured by a Tektronix MSO04102 oscilloscope. FIG. 10 illustrates the time domain measurement results of the tested mockup of the circuit 400. The switching frequency of the switch 442 was 2.8 MHz. Although the PIN diode switch 442 has a low reverse recovery time, the fall and rise time of the pulse generator 444 limits the switching frequency. The low Q factor of the components is also another non-ideal factor that affects the measurement. However, it can be seen in FIG. 10 that oscillation frequency shifts from source frequency 70 MHz to 115 MHz and decays exponentially.

EXAMPLE 3

Since a high-Q antenna can be characterized by a high-Q resonator, the entire analysis of a switched resonator can be applied to a high-Q antenna. The configuration for a modulated antenna is presented in FIG. 5, and an exemplary embodiment of the antenna 510 is illustrated in FIG. 11A. In an exemplary embodiment, the PIFA antenna 1000 illustrated in FIG. 11A can be miniaturized for use in implanted devices.

A simulation of the circuit 500 in which the antenna 510 is embodied as the antenna was run. The antenna 1000 was loaded with two switched capacitors, $C_1$ and $C_2$, generating two resonant frequencies, namely 400 MHz and 500 MHz. FIG. 13A shows the voltage at the tuning port 1030, and FIG. 13B shows the pulse train 535.

Similar to the resonator 410, 410', the switching time, $t_s$, of the capacitors, $C_1$ and $C_2$, should by synchronous with the zero crossing of the capacitor, $C_1$ or $C_2$, voltage in order to transmit at maximum power. FIGS. 14A and 14B show the radiated fields at a distance of 1 meter away from the antenna 1000 for respective switching frequencies of 50 MHz and 25 MHz. It is seen that the switching frequency (bit rate) controlled by the pulse train 535 is not limited to the bandwidth of the antenna 1000 and can be increased as required. This property becomes important when a low frequency antenna is demanded as is the case in most implanted antenna applications. By using the proposed technique, he bit rate can be increased to the order of the carrier frequency and hence, operating frequency and bandwidth of the antenna 1000 do not limit the data transfer rate.

EXAMPLE 4

Figure 15A:
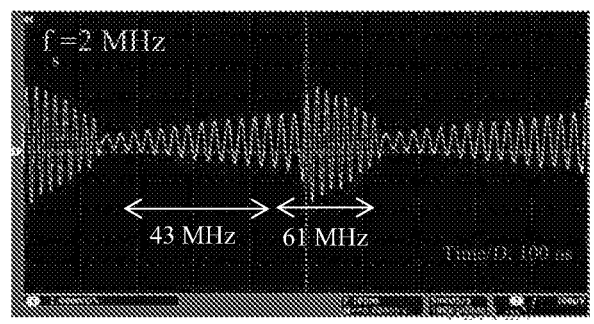
FIGS. 15A-15C illustrate various plots resulting from a prototype of the antenna of FIG. 11A used in the circuit of FIG. 5, in accordance with an exemplary embodiment of the present invention.
Figure 15B:
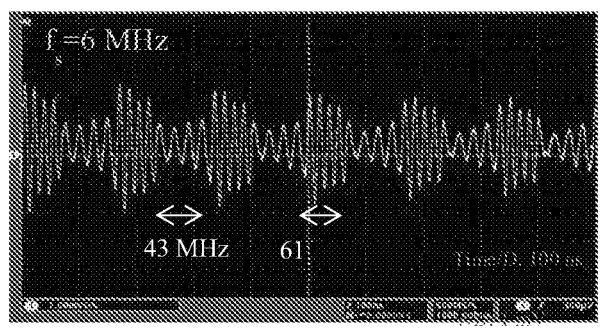
Figure 15C:
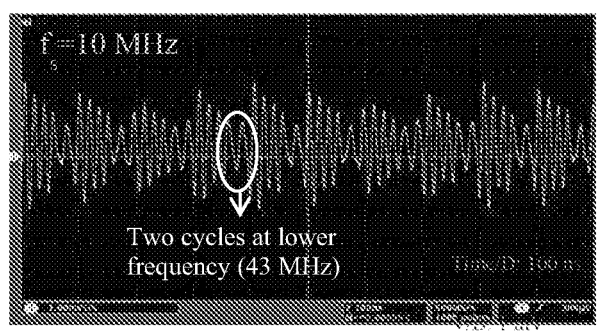

For demonstration purposes, a PIFA antenna was prototyped for use as the antenna 1000 in the circuit 500 and measured. The prototyped antenna was a scaled version for this experiment and could be made much smaller for practical applications. A PIN diode was used as the switch 542. The measured data for case of $f_1$=43 MHz, $f_2$=61 MHz for different modulating signal frequencies, $f_s$, of 2 MHz, 6 MHz, and 10 MHz are presented in FIGS. 15A, 15B, and 15C, respectively. Experimental results show that the narrowband PIFA antenna is able to radiate up to a 10 MHz bandwidth over center frequency of 52 MHz. However, by using a fast switching technology, the data rate can be further increased up to a single cycle at the lower frequency. Also, the antenna 1000 can be miniaturized down to sub-millimeter size for a selected center frequency and a wide band signal.

EXAMPLE 5

Figure 16A:
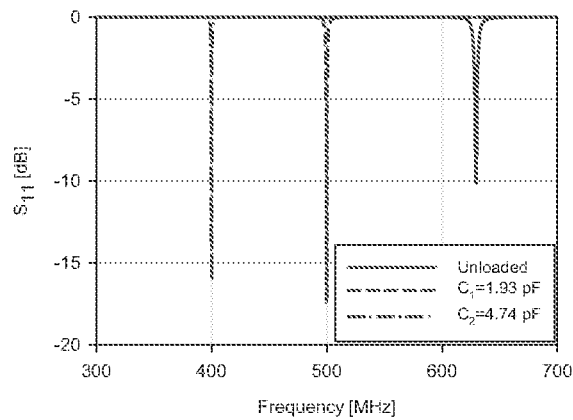
FIG. 16A illustrates a plot of return loss of a simulated ECLA, in accordance with an exemplary embodiment of the present invention.

FIG. 16A illustrates the return loss of a simulated ECLA 1200 with L=20 mm, W=15 mm, $w_f$=3.2 mm, $h_c$=0.5 mm, $w_c$=10 mm and $h_f$=2.5 mm. The unloaded antenna resonates at $f_0$=630 MHz with 1.65 MHz 3-dB bandwidth ($Q_0 \approx 382$). The electrical dimension of the unloaded antenna is 0.04λ× 0.04λ×0.03λ. By loading the antenna with two capacitors $C_1$=1.93 pF and $C_2$=4.74 pF, resonant frequency can be tuned at $f_1$=500 MHz and $f_2$=400 MHz with a 3-dB bandwidth of $B_1$=1.6 MHz and $B_2$=0.8 MHz ($Q_1$=312.5 and $Q_2$=500).

Figure 16B:
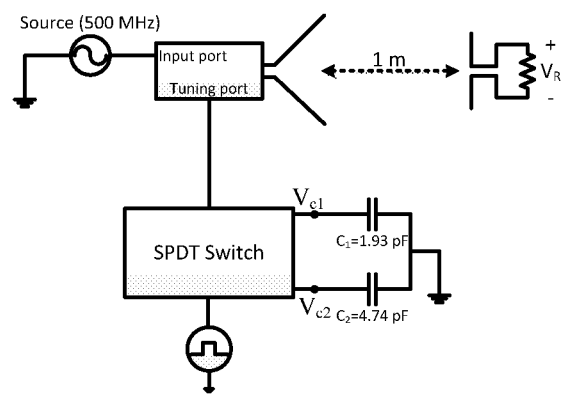
FIG. 16B illustrates a set-up for the simulated ECLA of FIG. 16A, in accordance with an exemplary embodiment of the present invention.

FIG. 16B illustrates the set-up for the simulated ECLA. A small dipole is placed 1 meter away from the antenna in the E-plane to measure the electric field. The measuring dipole is aligned with the co-pol direction and terminated by a high impedance. In order to preserve the stored energy in the capacitors, the switching moment must be synchronous with the zero-crossing of the capacitors' voltage. This requires the resonant frequencies to be integer multiples of the switching frequency.

Figure 16C:
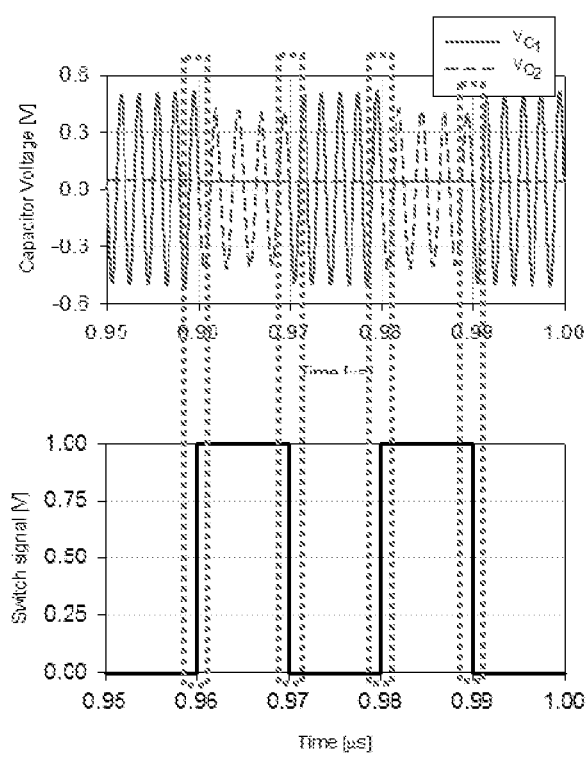
FIG. 16C illustrates voltages of capacitors of the set-up of FIG. 16B, in accordance with an exemplary embodiment of the present invention.

It is worthwhile to point out that due to the delay of the transmission-line connecting the source to the antenna, the voltage zero-crossings may move forward. This can be compensated by delaying the switch signal such that the switching moments coincide with the voltage zero-crossing of the capacitors. FIG. 16C shows the voltage of the capacitors in conjunction with switching signal at 50 MHz. Since the distance between the feeding and tuning ports is small, transmission-line delay would not be significant with this configuration.

The switching signal is a two-level voltage waveform. "0" indicates the OFF state of the switch which is associated with the capacitor, $C_1$, and frequency $f_1$, while "1" indicates the ON state of the switch which puts the capacitor, $C_2$, in charge of the transient radiation at frequency $f_1$.

Figure 16D:
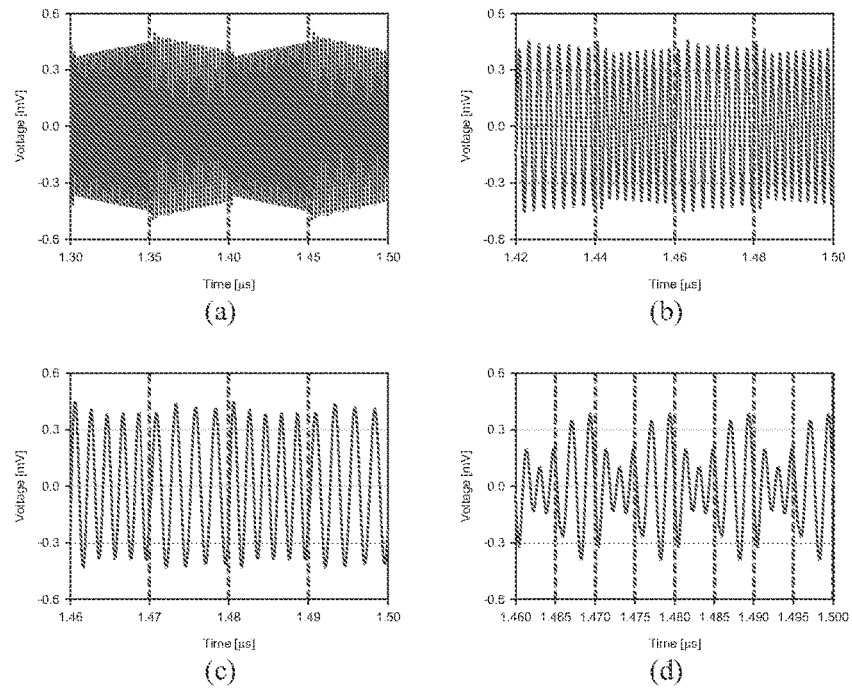
FIG. 16D shows a received signal sensed by a measuring dipole for different switching frequencies of the set-up of FIG. 16B, in accordance with an exemplary embodiment of the present invention.

FIG. 16D shows a received signal sensed by a measuring dipole for 4 different switching frequencies: 10, 25, 50 and 100 MHz. Since each pulse represents two bits, the bit-rate is twice the switching frequency. It can be seen that regardless of the extremely narrow bandwidth of the antenna, bit-rate can be as high as the carrier frequency. This high bit-rate achievement is mainly due to two factors. Firstly, the time-varying property of the antenna obviates the need for covering the carrier frequency deviation, $\Delta f=f_2-f_1$. In other words, the antenna is instantaneously tuned to $f_1$ and $f_2$ when logic "0" and "1" are to be transmitted, respectively. Secondly, since the loading capacitors change the natural resonances of the antenna, near-field reactive energy switches between different frequencies. After several switching cycles, the stored energy reaches a maximum and afterwards, the fields shift between two resonant frequencies due to variation of the antenna's fundamental resonance, resulting in radiative power shifts between the two frequencies. The nature of this frequency shifting arises from the variation of antenna poles and is not linked to the antenna input signal. Therefore, if the antenna is sufficiently high-Q and the switching moment is properly chosen such that during the transient mode the stored energy doesn't discharge dramatically and remains close to its maximum, the conventional impedance bandwidth will not limit the radiation bandwidth and the antenna is able to respond to any fast frequency shifting caused by switching the natural resonances.

EXAMPLE 6

For demonstration purposes, an ECLA antenna was prototyped for use as the antenna 1200 in the circuit 500 and measured. The experiments were performed at a low frequency in order to implement a high-Q antenna and achieve a good isolation between the two alternating frequencies. In addition, realizing an ultra-fast and high-Q switching mechanism is a challenge as most of the commercial RF switches suffer from a relatively high insertion loss and low speed. Nevertheless, ultra-fast switching can be addressed by recently developed technologies such as SiGe transistors. The prototyped antenna used the following dimensions: L=100 mm, W=30 mm, $w_f$=25 mm, $h_c$=0.51 mm, $w_c$=30 mm and $h_f$=2.5 mm. The bottom side of the antenna that included the switch circuitry was supported by a 20 mil Rogers RT/duroid 5880.

Figure 17A:
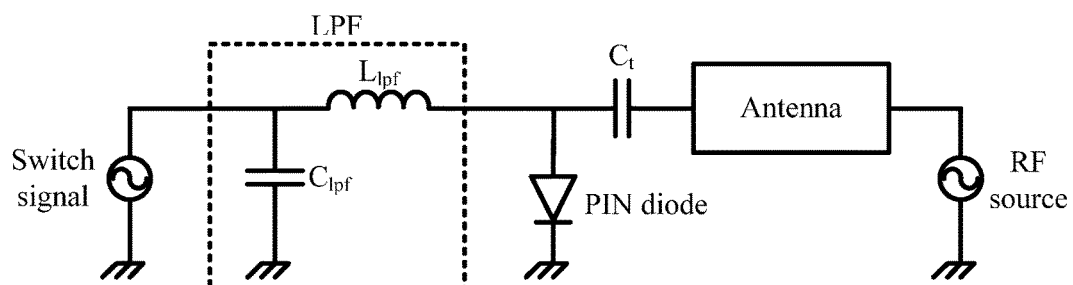
FIG. 17A illustrates switching circuitry of a prototyped circuit in accordance with the circuit of FIG. 5 using the antenna of FIG. 12, in accordance with an exemplary embodiment of the present invention.

A low-loss PIN diode (Avago HSMP-482) was used in a shunt arrangement as depicted in FIG. 17A, which shows the switching circuitry. The switching signal was separated from the antenna by a low pass filter. When the PIN diode was in reverse bias (switch-OFF), the tuning port was open-circuited, and the antenna was not loaded. Therefore, the antenna resonated at its original resonant frequency, $f_1$. In the forward-bias state (switch-ON), the antenna was loaded by the capacitor, $C_1$, through a 0.6Ω resistance of the forward-biased PIN diode and resonated at the lower frequency, $f_2$.

Figure 17B:
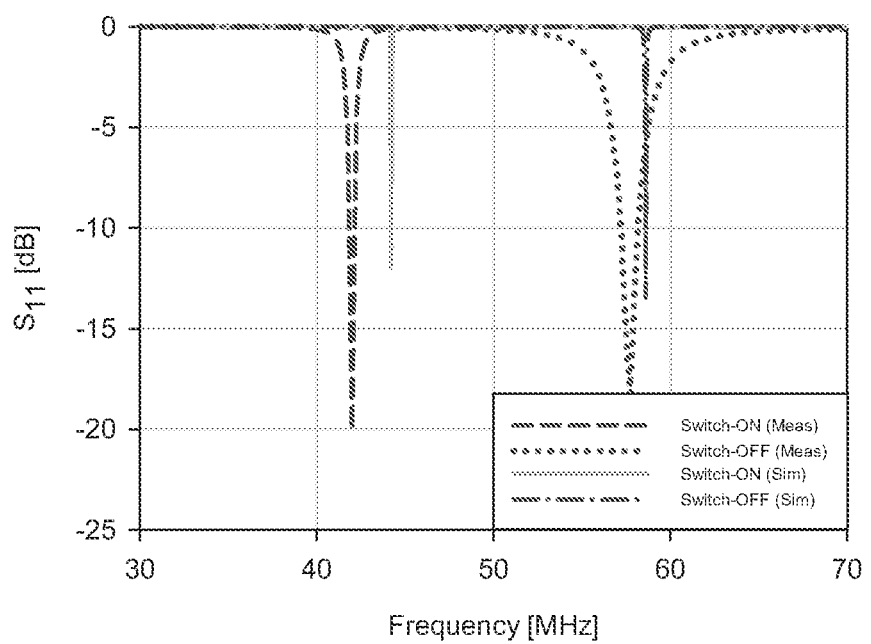
FIG. 17B illustrates a plot comparing measured return loss of the prototyped circuit of FIG. 5 using the antenna of FIG. 12 to a simulated return loss, in accordance with an exemplary embodiment of the present invention.

Although the capacitors and PIN diode are chip components, because of their relatively low-Q properties, particularly for the capacitors, measurement showed that the loaded Q is considerably affected. FIG. 17B compares the measured return loss with the results of full-wave simulation that uses an ideal capacitor. The measured resonant frequencies was $f_1$=57.75 MHz and $f_2$=42 MHz where the tuning capacitor was $C_1$=47 pF. The low pass filter with $C_{lpf}$=470 pF and $L_{lpf}$=1 uH provided a suppression equal to 30 dB and 25 dB at frequencies $f_1$ and $f_2$, respectively Measured Q factors at $f_1$ and $f_2$ were $Q_1$=18.6 and $Q_2$=52.5. The magnitude of return loss at each frequency was measured less than 0.04 dB when the antenna was tuned to the other frequency and hence the leakage was sufficiently small. Since the Q factors were still much greater than one, and the two resonant frequencies were well-isolated from each other, this configuration could be used to validate the techniques described herein.

Figure 18:
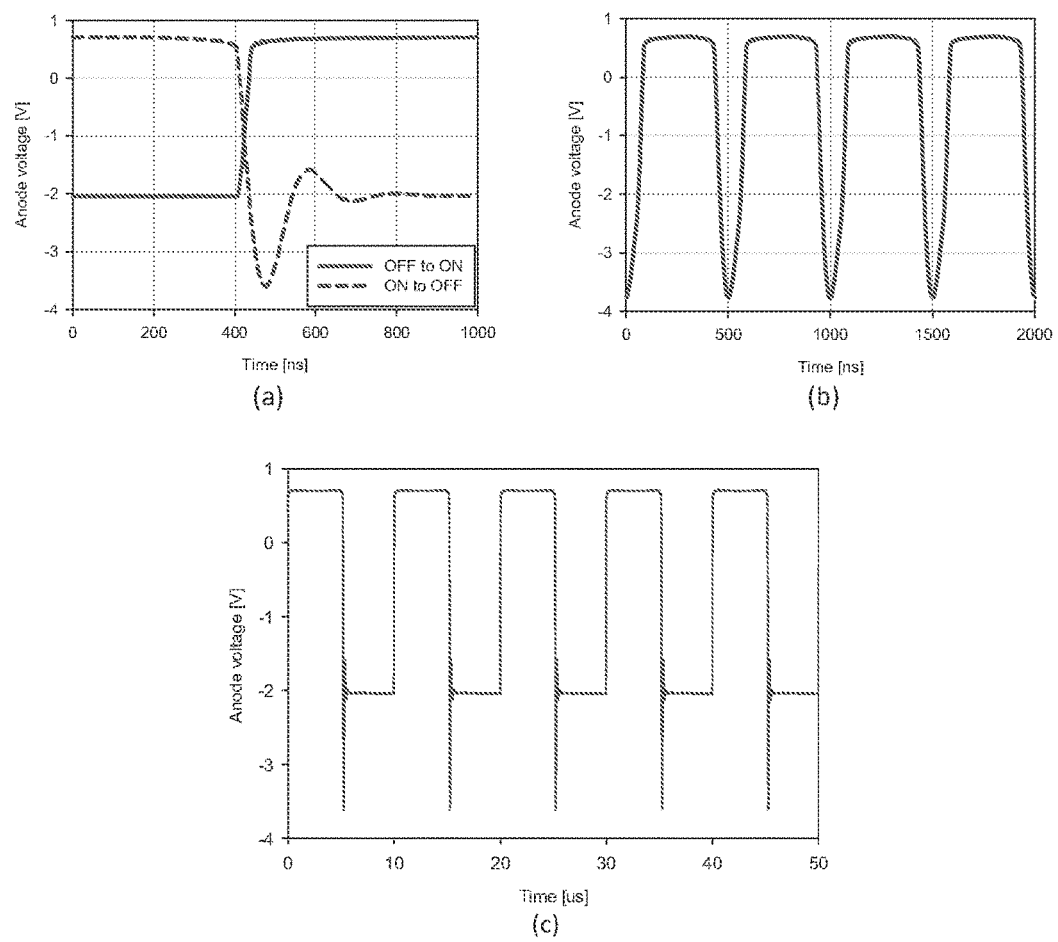
FIGS. 18A-18C illustrate various plots of measurements resulting from the prototyped circuit of FIG. 5 using the antenna of FIG. 12, in accordance with an exemplary embodiment of the present invention.
Figure 19:
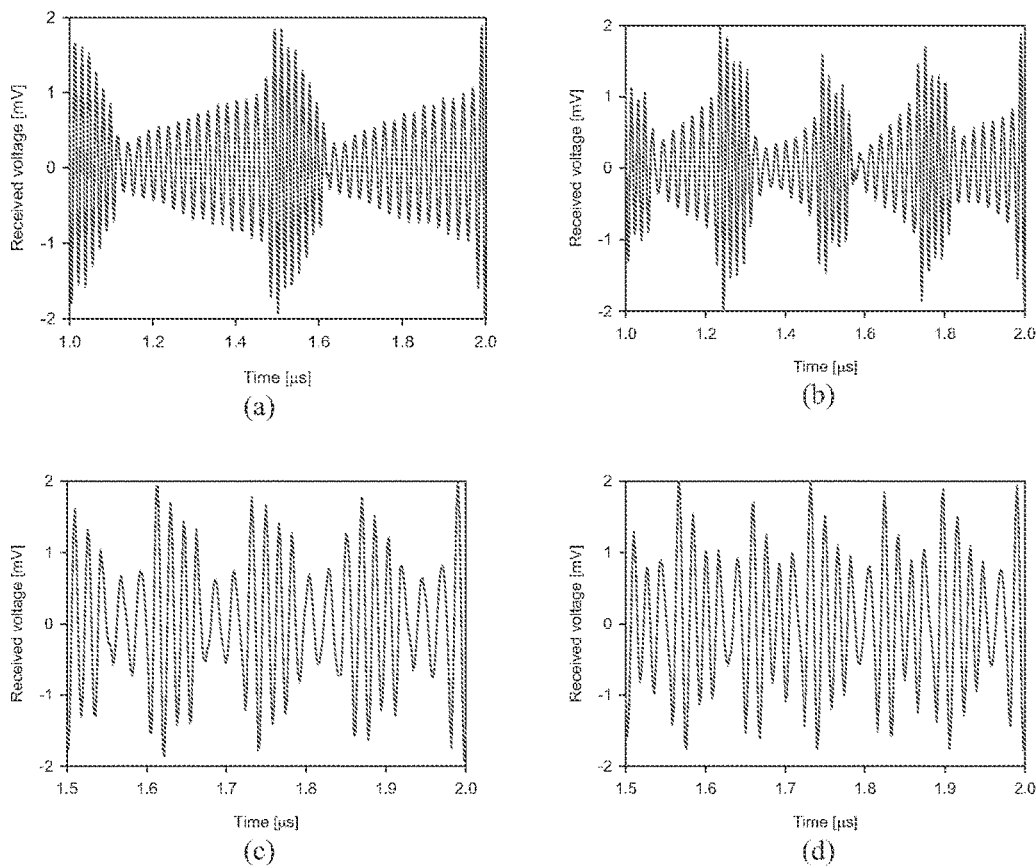
FIGS. 19A-19D 20A, 20B, 21A-21C, 22A, 22B, 23A, 23B, and 24A-24D show various plots relating to the prototyped circuit in accordance with the circuit of FIG. 5 using the antenna of FIG. 12, in accordance with an exemplary embodiment of the present invention.

The maximum practical bit-rate in the experiment depended on the switching speed which was determined by the PIN diode rise and fall time. FIG. 18A shows the measured response of the utilized PIN diode to a step-like function varying between ±2 V. The ON and OFF time based on 0 to 0.65 V and vice versa was measured about 65 ns. This limited the switching speed to about 15 MHz. Also, the PIN diode exhibited an overshoot about 1.5 times the biasing voltage at the falling edge causing the OFF time to be shortened. The switch signal measured as the anode voltage at frequency 2 MHz is shown in FIG. 18B. Even though the duty cycle of the pulse was 50%, the switch-ON duration associated with the lower frequency, $f_2$, was approximately twice the switch-OFF duration that represented the higher frequency, $f_1$. The switch signal measured as the anode voltage at frequency 100 KHz is shown in FIG. 18C. The ratio of switch-ON to switch-OFF shows improvement over that of FIG. 18B FIG. 19 shows the voltage waveform at the receiving dipole when the switched ECLA was in transmitting mode. The RF source was an R&S ZVA50 vector network analyzer in the CW mode which excited the antenna at the frequency $f_2$=42 MHz. A Tektronix AFG3252 signal generator was used to provide a periodic pulse as the switching signal. Time-domain electric fields were measured by a Tektronix MSO4102 oscilloscope with 1 MΩ input impedance. The electric fields shown in FIG. 19A-D were measured at switching frequencies 2 MHz, 4 MHz, 8 MHz and 12 MHz, respectively. It can be seen that even though the antenna bandwidth was measured about 3 MHz at the upper band, an FSK modulation with a bit-rate equal to R=2×12=24 Mb/s was realized. The restriction on the switching frequency was due to the time constant of the low-pass filter and also the ON and OFF time of the PIN diode. Hence, the bit-rate can be further improved by using a faster switch and improving the filter performance. For demonstration purposes, the antenna was also measured in the receiving mode.

Figure 20:
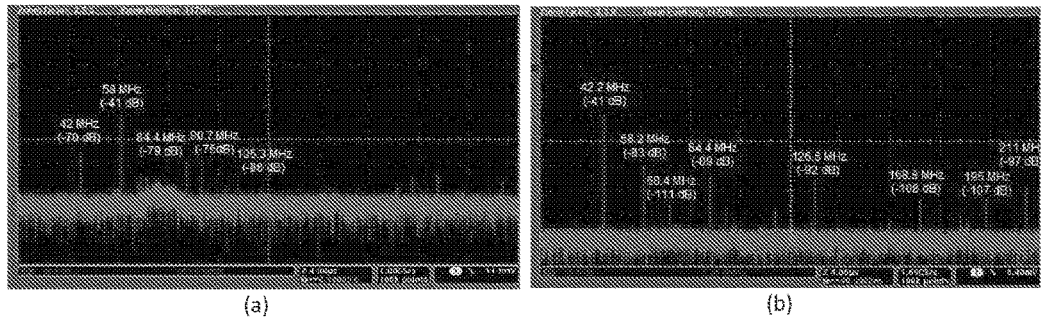

FIG. 20 shows the received voltage at the input port of the ECLA when operating in a receiving mode.

For demonstration purposes, the antenna has also been measured in the receiving mode. An HP8648D function generator and an HP8625A synthesized RF sweeper were connected via a power combiner to provide a dual-tone excitation for a small dipole which was used as the transmitting antenna. Since the received power by the ECLA was different at each frequency due to different impedance matching, the transmitted power was tuned at each RF source such that the ECLA received both frequencies at the same power level. Source 1 fed the dipole at 58 MHz and power level 13 dBm and Source 2 was set to 42 MHz at power level 20 dBm.

FIGS. 20A and B show the frequency spectrum of the received voltage at the input port of the ECLA when connected to a 1 MΩ oscilloscope in the switch-OFF state and the switch-ON state, respectively. FIG. 20A depicts the switch-OFF state where the ECLA received the higher frequency (58 MHz) signal, and the switch-ON state is shown in FIG. 20B where lower frequency (42 MHz) is received. At each state, the out-of-tune frequency component was about 29 dB below the level of tuned frequency. However, both frequencies were evenly received by the ECLA at the level −41 dB.

Figure 21:
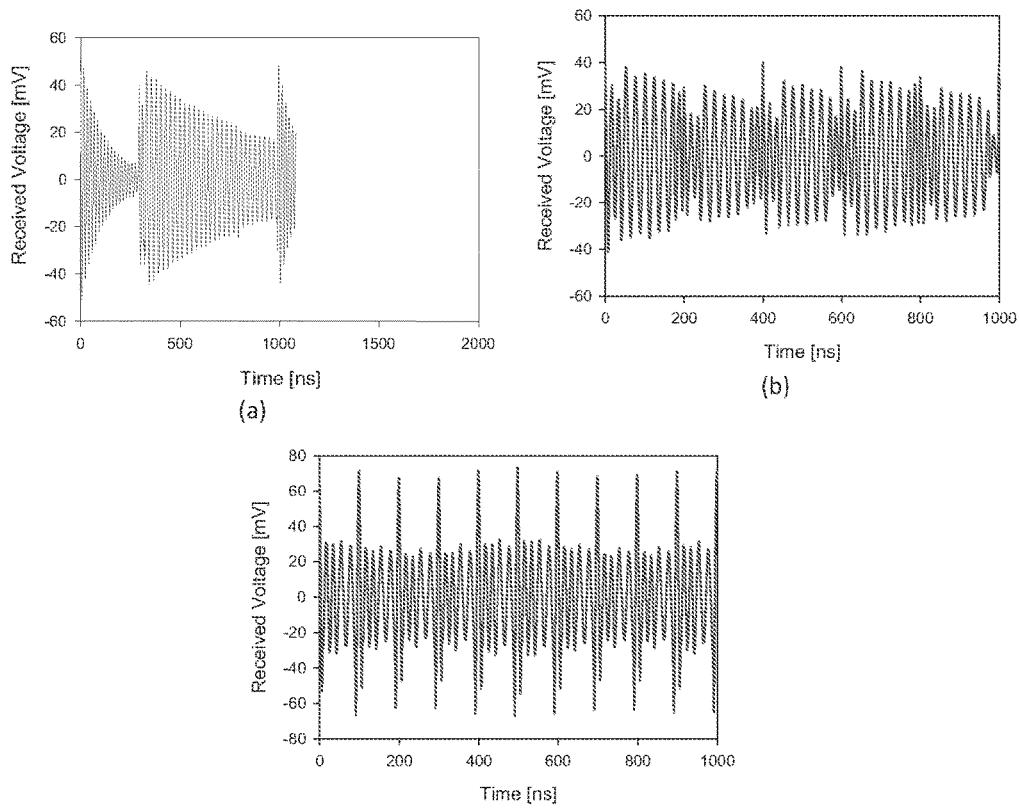

FIGS. 21A-C show the received signals when both frequencies are on the air and the antenna is switched at frequencies 1 MHz, 5 MHz and 10 MHz, respectively. Similar to the transmitting mode, the switched antenna receives both frequencies according to the switching frequency.

Figure 22:
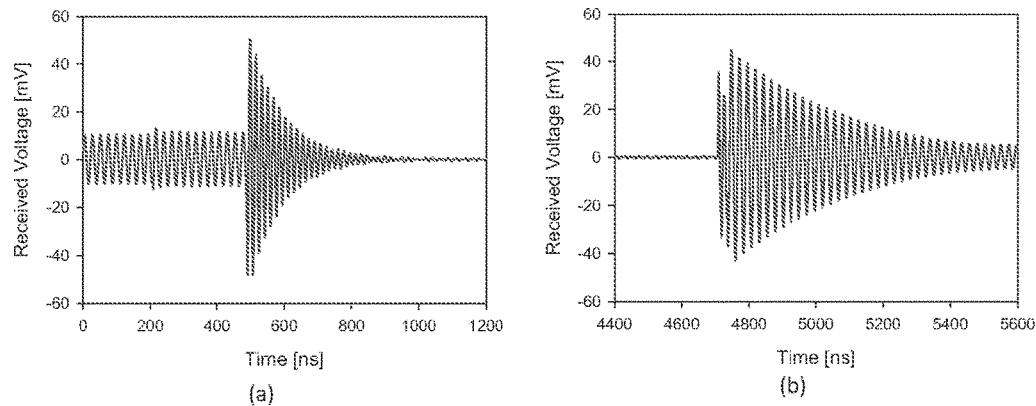

When the switching frequency increases, the radiation is fully in transient mode. It means that the received voltage by the antenna in Rx mode or radiated fields in Tx mode are due to the transient response of the antenna caused by the momentary current distribution right after the switching moment, when the location of fundamental pole of the antenna changes. To study this phenomenon more closely, one of the source frequencies was turned off when the antenna operated in Rx mode and the received voltage was measured. FIGS. 22A-B show the open-circuit terminal voltage at the receiving ECLA when the higher frequency source (58 MHz) is turned off and only 42 MHz signal is on the air. The switching frequency was chosen to be very small in order to have long intervals between two consequent switching states and hence, the transient response at each state was fully observable.

FIG. 22A shows the switch-OFF moment when the resonant frequency of the antenna shifts to the 58 MHz which was not supported by the RF source. It can be seen that an exponentially-decaying voltage waveform could be measured at 58 MHz. The damping factor of this transient response was inversely related to the Q factor of the antenna at 58 MHz.

Figure 23:
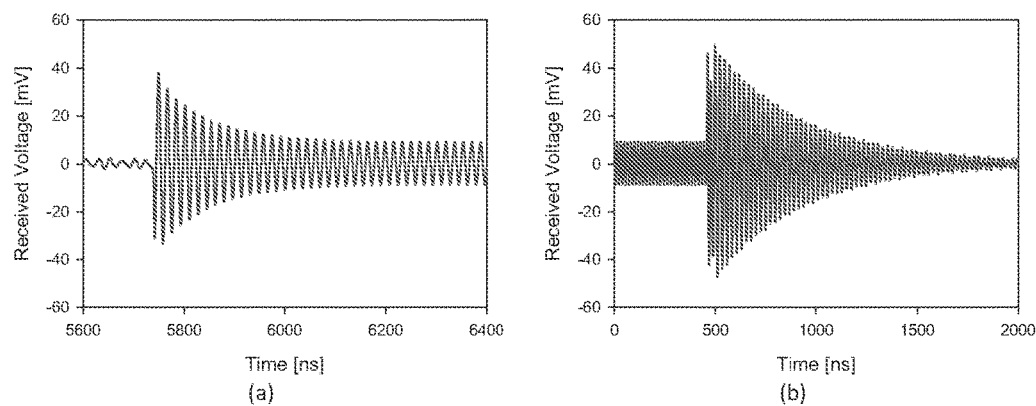

In FIG. 22B, the switch-ON moment is shown when the resonant frequency of the antenna changes from 58 MHz to 42 MHz. The voltage waveform for this case is composed of the transient response and the steady state whose magnitude is dictated by the received power level. A similar phenomenon occurs when the lower frequency source (42 MHz) is turned off and the 58 MHz signal is on the air. The receiving voltage for this case is shown in FIGS. 23A and B.

The measurement results indicates that if a single transmitting frequency is on the air, the other frequency component can be generated by switching the resonant frequency of the antenna. It suggests that if the switching rate is high enough such that the antenna operates in transient mode at both frequencies, one of the sources can be removed and only a single source is sufficient to receive a signal which alternatively shifts between two frequencies. This can be seen in FIGS. 24A and B that show the measured terminal voltage of the ECLA when switched at 5 MHz and in FIGS. 24C and D that show the measured terminal voltage of the ECLA when switched at 100 KHz.

Figure 24:
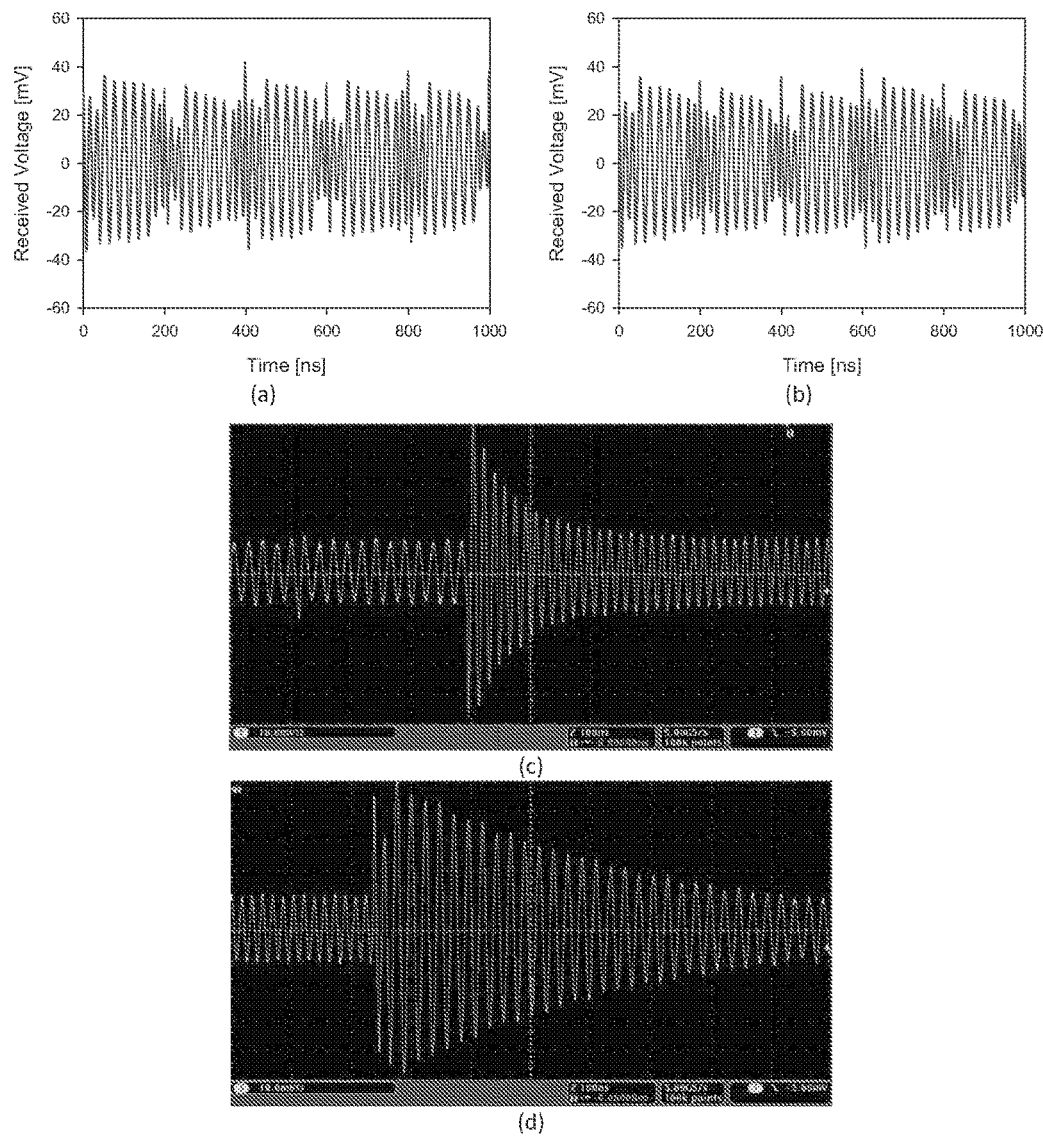

FIG. 24A shows the case that higher frequency source (58 MHz) is removed and FIG. 24B is the received voltage waveform when the lower frequency (42 MHz) is turned off. It is interesting to notice that these waveforms are similar to FIG. 21B where both frequencies are on the air. FIG. 24C shows the shows the instant when the measured received voltage switches from lower frequency to higher frequency. FIG. 24D shows the instant when measured received voltage switches from higher frequency to lower frequency.

Since each frequency component requires an initial current distribution to be transmitted or received in the transient mode, further simplification can be carried out to minimize the architecture of the antenna as a self-contained frequency modulation transmitter.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

LIST OF REFERENCES

The following references cited above are incorporated by reference:

[1] Chu, L. J., "Physical limitations on omni-directional antennas," Journal of Applied Physics, 19, 1163-1175, December 1948.

[2] Harrington, R. F., "Effect of antenna size on gain, bandwidth, and efficiency," Journal of Research of the National Bureau of Standards, 64D, 1-12, January-February 1960.

[3] McLean, J. S., "A re-examination of the fundamental limits on the radiation q of electrically small antennas," IEEE Transactions on Antennas and Propagation, AP-44, 672-675, May 1996.

[4] Ghovanloo, M., and K. Najafi, "A wideband frequency-shift keying wireless link for inductively powered biomedical implants," IEEE Transactions on Circuits and Systems—I: Regular Papers, 51(12), 2374-2383, December 2004.

[5] Miranda, H., V. Gilja, C. A. Chestek, K. V. Shenoy, and T. H. Meng, "Hermesd: A high-rate long-range wireless transmission system for simultaneous multichannel neural recording applications," IEEE Transactions on Biomedical Circuits and Systems, 4(3), 181-191, June 2010.

[6] Lee, S. B., M. Yin, J. R. Manns, and M. Ghovanloo, "A wideband dual-antenna receiver for wireless recording from animals behaving in large arenas," IEEE Transactions on Biomedical Circuits and Systems, 60(7), 1993-2004, July 2013.

[7] Wheeler, H. A., "Fundamental limitations of small antennas," Proceedings of the IRE, 35, 1479-1484, December 1947.

[8] Schaubert, D. Hl., "Application of prony's method to time-domain reflecto-meter data and equivalent circuit synthesis," IEEE Transactions on Antennas and Propagation, 27(2), 180-184, March 1979.

[9] Schelkunoff, S. A., "Representation of impedance functions in terms of resonant frequencies," Proceedings of the I.R.E., 32, 83-90, February 1944.

[10] Kim. Y., and H. Ling, "Equivalent circuit modeling of broadband antennas using a rational function approximation," Microwave and Optical Technology Letter, 48(5), 950-953, May 2006.

[11] Adve, R. S., T. K. Sarkar, S. M. Rao, E. K. Miller, and D. R. Pflug, "Application of the cauchy method for extrapolating/interpolating narrow-band system responses." IEEE Transactions on Microwave Theory and Techniques, 45(5), 837-845, May 1997.

[12] Michalski, K. A., and L. W. Pearson, "Equivalent circuit synthesis for a loop antenna based on the singularity expansion method," IEEE Transactions on Antennas and Propagation, 32(5), 433-441, May 1984.

[13] Simpson, T. L., J. C. Logan, and J. W. Rockway, "Equivalent circuits for electrically small antennas using Is-decomposition with the method of moments" IEEE Transactions on Antennas and Propagation, 37(12), 1632-1635, December 1989.

[14] Ilamid, M., and R. Hamid, "Equivalent circuit of dipole antenna of arbitrary length," IEEE Transactions on Antennas and Propagation, 45(11), 1695-1696, November 1997.

[15] Love, A. W., "Equivalent circuit for aperture antennas," Electronics Letters 23(13), 708-710.

[16] Vainikainen, P., J. Ollikainen, O. Kivekäs, and I. Kelander, "Resonator-based analysis of the combination of mobile handset antenna and chassis," IEEE Transactions on Antennas and Propagation, 50(10), October 2002.

[17] Tang, T. G., Q. M. Tieng, and M. W. Gunn, "Equivalent circuit of a dipole antenna using frequency-independent lumped elements," IEEE Transactions on Antennas and Propagation, 41(1), 100-103, January 1993.

[18] Streable, G. W., and L. W. Pearson, "A numerical study on realizable broad-band and equivalent admittances for dipole and loop antennas." IEEE Transactions on Antennas and Propagation, 29(5), 707-717, September 1981.

[19] Liu, G. K. H., and R. D. Murch. "Compact dual-frequency pifa design using lc resonators." IEEE Transactions on Antennas and Propagation, 50(10), 1433-1444. October 2002.

What is claimed is:

1. A circuit for tuning a resonance frequency of an electrically small antenna, the circuit comprising:
   a first source configured for providing a modulation signal;
   a second source configured for providing a periodic electrical signal;
   an antenna; and
   a tuning circuit comprising:
      a first capacitive device;
      a second capacitive device; and
      a switch configured for alternately coupling the first capacitive device and the second capacitive device to the antenna for modulating a resonance frequency of the antenna between a first resonant frequency and a second resonant frequency and only between the first resonant frequency and the second resonant frequency in response to the modulation signal,
   wherein the first source is configured for providing the modulation signal to the tuning circuit so that the switch alternately couples one of the first capacitive device and the second capacitive device to the antenna while decoupling the other one of the first capacitive device and the second capacitive device from the antenna when a voltage across the other one of the first capacitive device and the second capacitive device is zero.

2. The circuit of claim 1, wherein the modulation signal is a digital signal, and wherein the switch is a solid state device configured for alternately coupling the one of the first capacitive device and the second capacitive device to the antenna while decoupling the other one of the first capacitive device and the second capacitive device from the antenna.

3. The circuit of claim 1, wherein the tuning circuit comprises a first capacitive device and a switch configured for controllably coupling the first capacitive device to and decoupling the first capacitive device from the antenna in response to the modulation signal when a voltage applied to the antenna by the periodic electrical signal is zero.

4. The circuit of claim 1, wherein the tuning circuit comprises a first inductive device and a switch configured for controllably coupling the first inductive device to and decoupling the first inductive device from the antenna for modulating the resonance frequency of the antenna when powered by the periodic electrical signal.

5. The circuit of claim 1, wherein the tuning circuit comprises a first inductive device and a switch configured for controllably coupling the first inductive device to and decoupling the first inductive device from the antenna in response to the modulation signal when a current provided to the antenna by the periodic electrical signal is zero for modulating the resonance frequency of the antenna.

6. The circuit of claim 1, wherein the antenna is an electrically small antenna.

7. A method for tuning a resonance frequency of an electrically small antenna, the method comprising steps of:
   generating a modulation signal;
   generating a periodic electrical signal;
   powering an antenna with the periodic electrical signal; and
   modulating a resonance frequency of the antenna between a first frequency and a second frequency and only between the first frequency and the second frequency in response to the modulation signal by alternately coupling a first capacitive device and a second capacitive device to the antenna; and
   decoupling the other one of the first capacitive device and the second capacitive device from the antenna when a voltage across the other one of the first capacitive device and the second capacitive device is zero.

8. The method of claim 7, wherein the step of modulating comprises controllably coupling a first capacitive device to and controllably decoupling the first capacitive device from the antenna in response to the modulation signal when a voltage applied to the antenna by the periodic electrical signal is zero.

9. The method of claim 7, wherein the step of modulating comprises controllable coupling a first inductive device to and controllably decoupling the first inductive device from the antenna to modulate the resonance frequency of the antenna between the first frequency and the second frequency in response to the modulation signal.

* * * * *